US010595233B2

(12) United States Patent
Zhang et al.

(10) Patent No.: US 10,595,233 B2
(45) Date of Patent: Mar. 17, 2020

(54) COMMUNICATION CONTROL METHOD, CONTROLLER, USER EQUIPMENT, AND FUNCTION INSTANCE

(71) Applicant: Huawei Technologies Co., Ltd., Shenzhen (CN)

(72) Inventors: Wei Zhang, Shanghai (CN); Jinfang Zhang, Shanghai (CN); Chenghui Peng, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/923,899

(22) Filed: Mar. 16, 2018

(65) Prior Publication Data
US 2018/0206152 A1 Jul. 19, 2018

Related U.S. Application Data

(63) Continuation of application No. PCT/CN2016/097649, filed on Aug. 31, 2016.

(30) Foreign Application Priority Data

Sep. 17, 2015 (CN) .......................... 2015 1 0593669

(51) Int. Cl.
*H04W 28/24* (2009.01)
*H04W 76/10* (2018.01)
(Continued)

(52) U.S. Cl.
CPC ........... *H04W 28/24* (2013.01); *H04M 15/66* (2013.01); *H04W 8/04* (2013.01); *H04W 72/12* (2013.01); *H04W 76/10* (2018.02); *H04W 88/02* (2013.01)

(58) Field of Classification Search
CPC . H04L 12/24; H04L 41/0803; H04L 41/0896; H04L 41/12; H04M 15/66;
(Continued)

(56) References Cited

U.S. PATENT DOCUMENTS 8,825,876 B2 * 9/2014 Krishnaswamy ..... H04W 48/18
709/228
8,948,726 B2 * 2/2015 Smith .................. H04W 8/183
455/406
(Continued)

FOREIGN PATENT DOCUMENTS

CN 102821154 A 12/2012
CN 103327529 A 9/2013
(Continued)

OTHER PUBLICATIONS

Kokku et al, NVS: A Substrate for Virtualizing Wireless Resources in Cellular Networks, IEEE, 14 pages, Oct. 2012.*
(Continued)

*Primary Examiner* — Frank Duong
(74) *Attorney, Agent, or Firm* — Leydig, Voit & Mayer, Ltd.

(57) ABSTRACT

The present disclosure provides a communication control method, a controller, a user equipment, and a function instance that can meet quality of service requirements of services with different requirements. The communication control method includes: obtaining, by a controller, a first slice identifier corresponding to a first service; determining, by the controller according to the first slice identifier, a first function instance corresponding to the first slice identifier; and separately sending, by the controller, to a first user equipment (UE) and the first function instance, instruction information for setting up a bearer, where the bearer is used to transmit a data packet of the first service corresponding to the first UE, the bearer corresponds to the first slice identi-
(Continued)

fier, and the instruction information carries an identity of the first UE and an identity of the first function instance.

17 Claims, 23 Drawing Sheets

(51) Int. Cl.
  *H04M 15/00* (2006.01)
  *H04W 8/04* (2009.01)
  *H04W 72/12* (2009.01)
  *H04W 88/02* (2009.01)

(58) Field of Classification Search
  CPC ....... H04W 8/04; H04W 28/24; H04W 72/12; H04W 76/10; H04W 88/02
  See application file for complete search history.

(56) References Cited

U.S. PATENT DOCUMENTS

| 9,462,477 | B2* | 10/2016 | Ahmad | H04W 16/14 |
| 9,775,045 | B2* | 9/2017 | Li | H04W 16/02 |
| 2013/0155963 | A1 | 6/2013 | Cillis et al. | |
| 2013/0303114 | A1 | 11/2013 | Ahmad et al. | |
| 2014/0086177 | A1 | 3/2014 | Adjakple et al. | |
| 2016/0105899 | A1 | 4/2016 | Zhou et al. | |
| 2016/0219076 | A1* | 7/2016 | Paczkowski | G06F 9/45558 |
| 2017/0257886 | A1 | 9/2017 | Adjakple et al. | |
| 2019/0021047 | A1* | 1/2019 | Zong | H04W 76/11 |

FOREIGN PATENT DOCUMENTS

| CN | 104349400 A | 2/2015 |
| CN | 104685935 A | 6/2015 |
| CN | 104767677 A | 7/2015 |
| WO | 2013149595 A1 | 10/2013 |

OTHER PUBLICATIONS

NGMN Alliance, 5G White Paper, 125 pages, Feb. 2015.*
Nguyen et al, Slicing the Next Mobile Packet Core Network, IEEE, 4 pages, 2014.*
Kiess et al.,"Base station virtualization for OFDM air interfaces with strict isolation," 2013 IEEE International Conference on Communications Workshops (ICC), XP032518525, dated Jun. 9, 2013, total 5 pages.

* cited by examiner

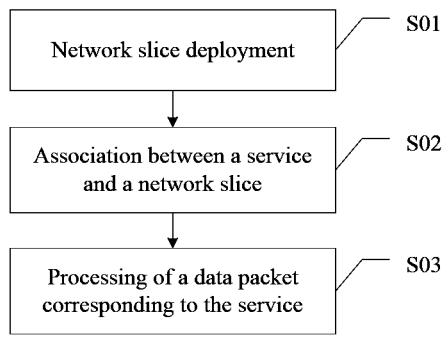
FIG. 12-a
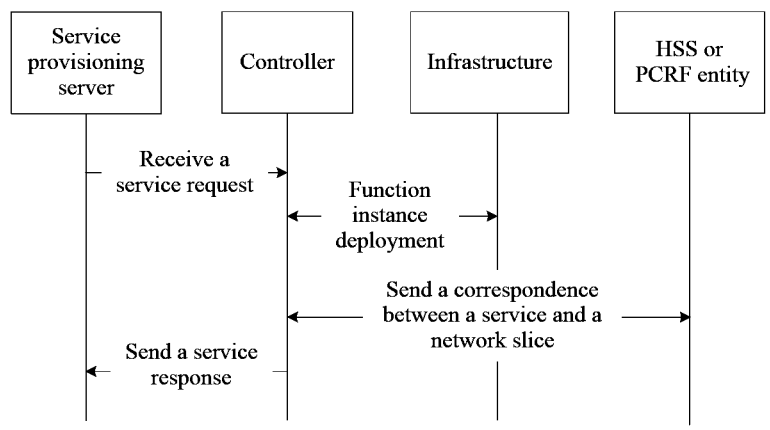
FIG. 12-b

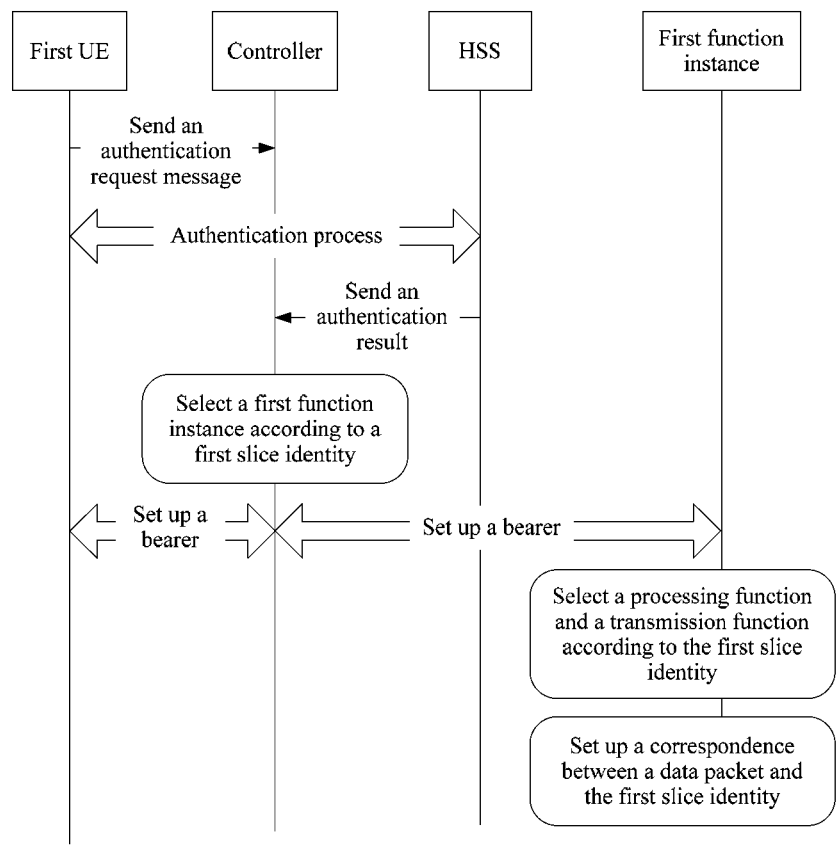
FIG. 12-c

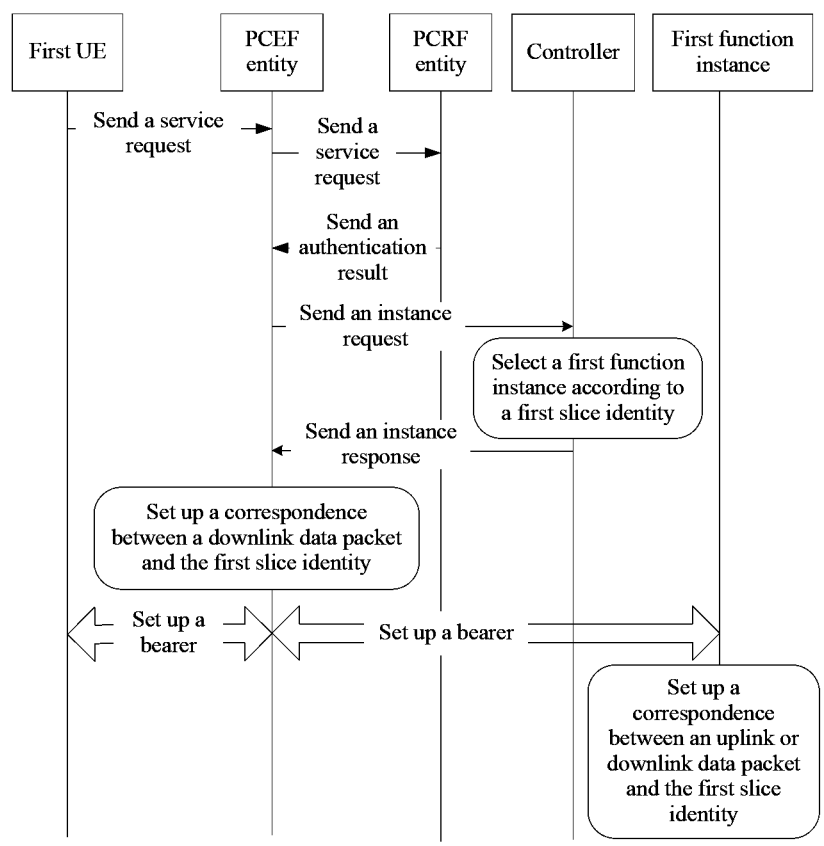
FIG. 12-d

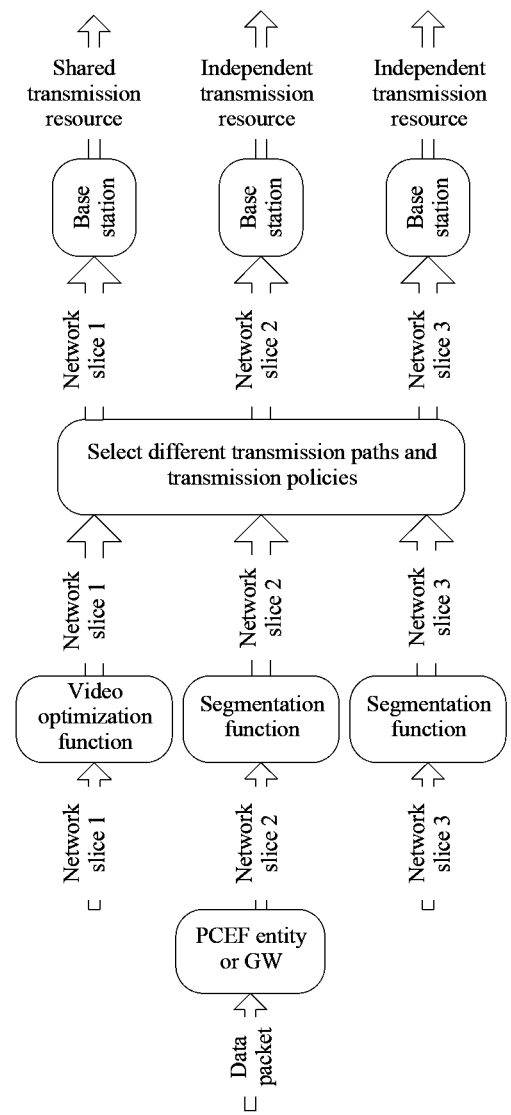
FIG. 12-e

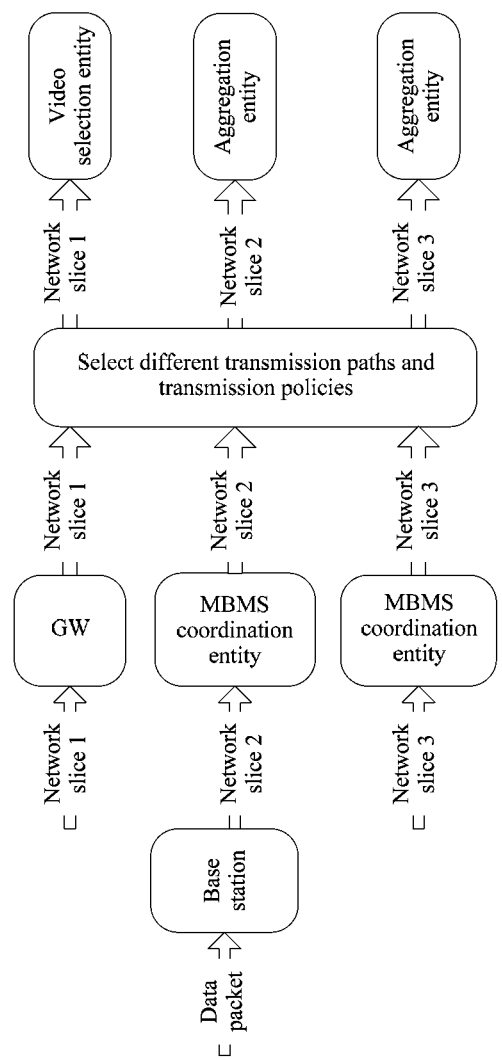
FIG. 12-f

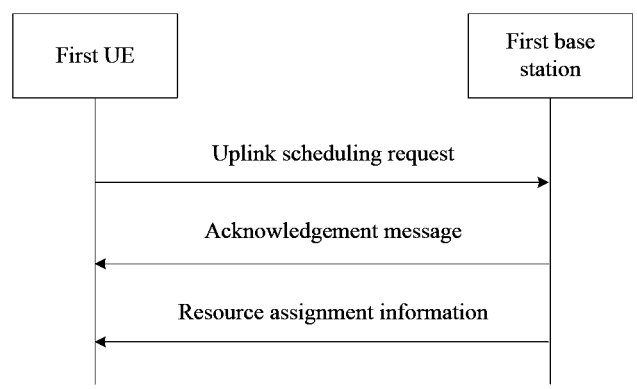
FIG. 12-g
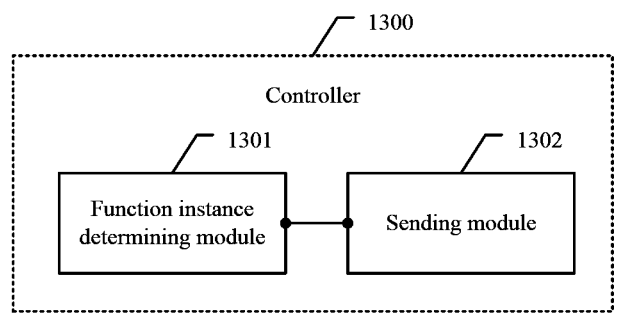
FIG. 13-a

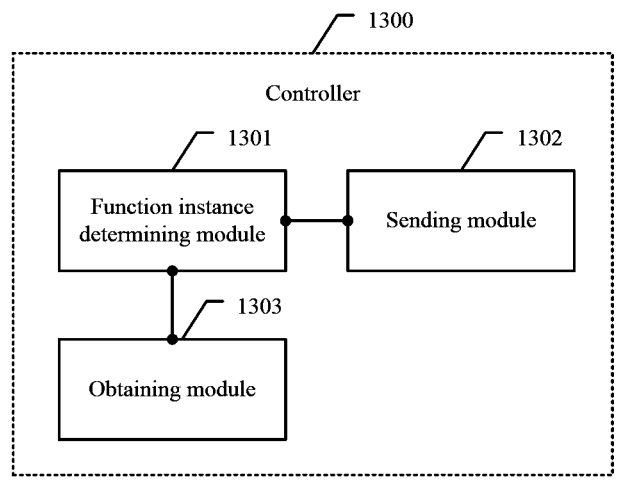
FIG. 13-b
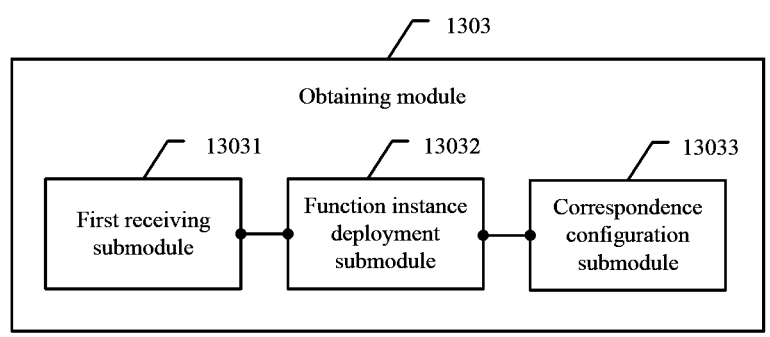
FIG. 13-c

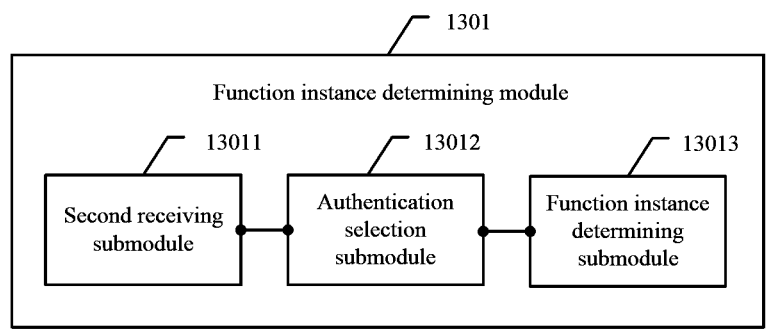
FIG. 13-d
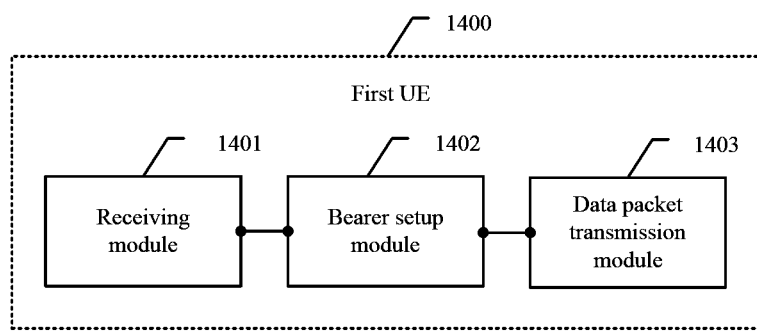
FIG. 14-a

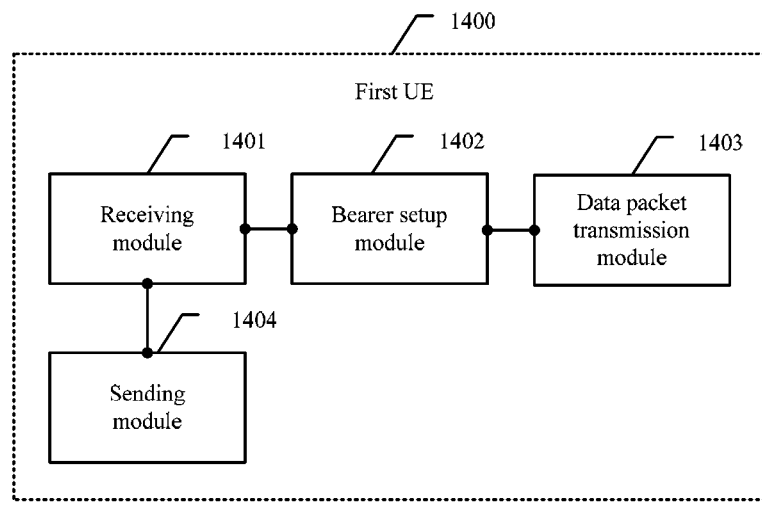
FIG. 14-b
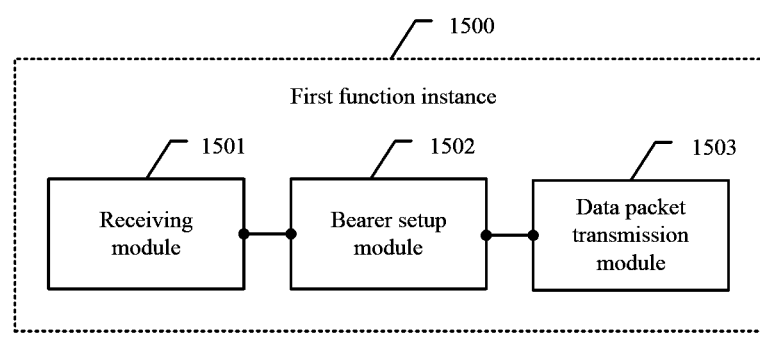
FIG. 15-a

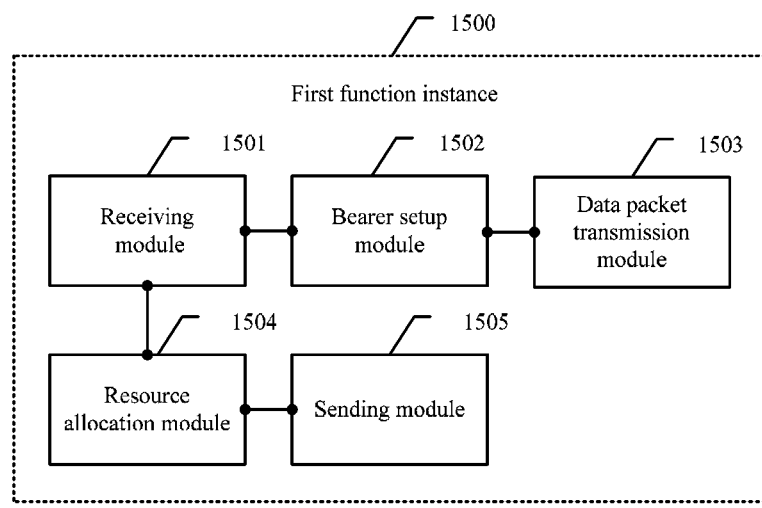
FIG. 15-b
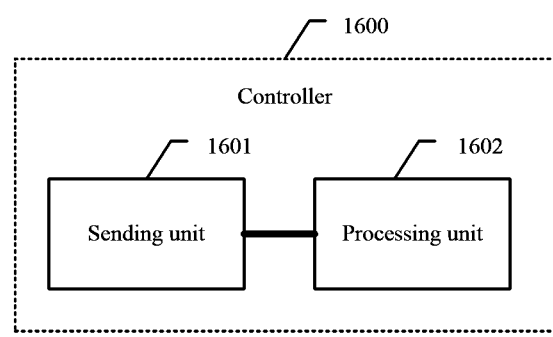
FIG. 16-a

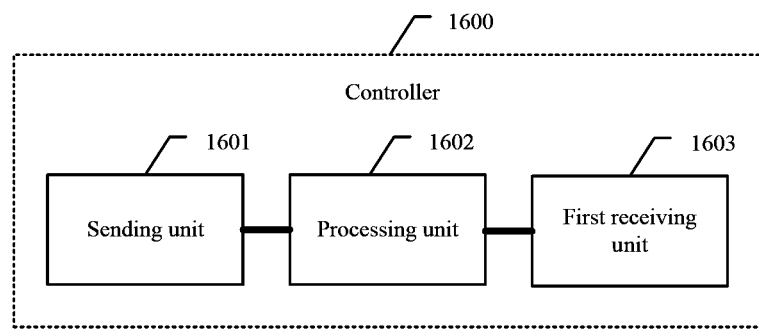
FIG. 16-b
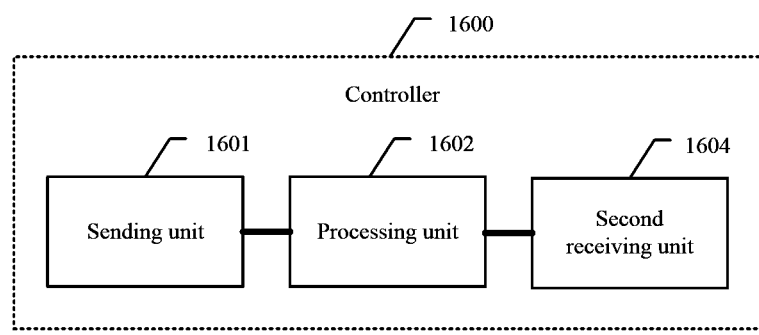
FIG. 16-c

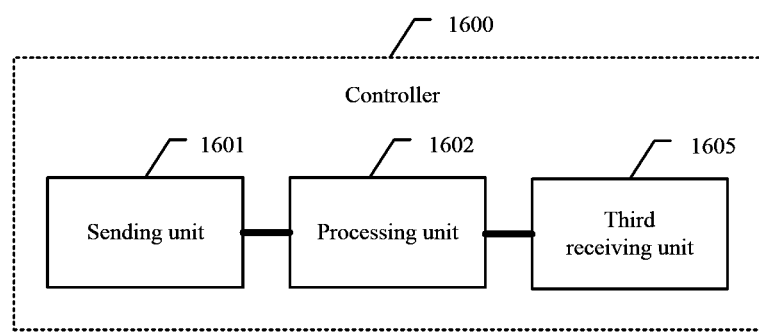
FIG. 16-d
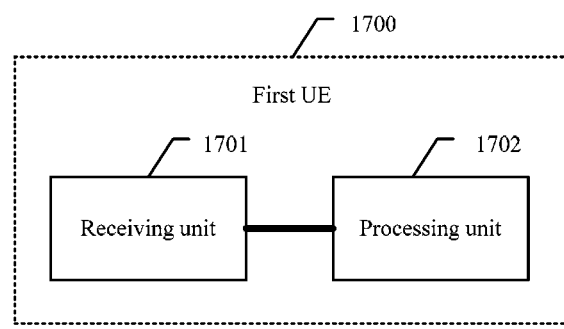
FIG. 17-a

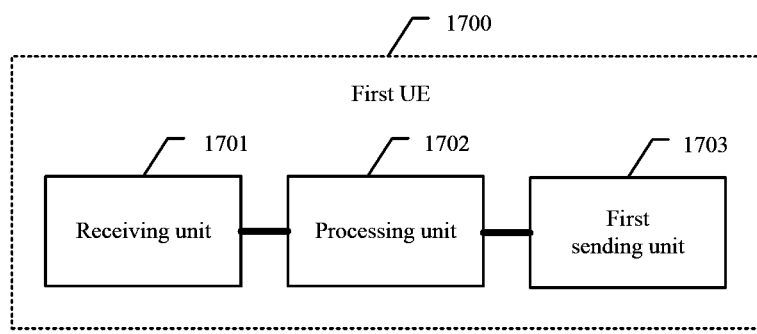
FIG. 17-b
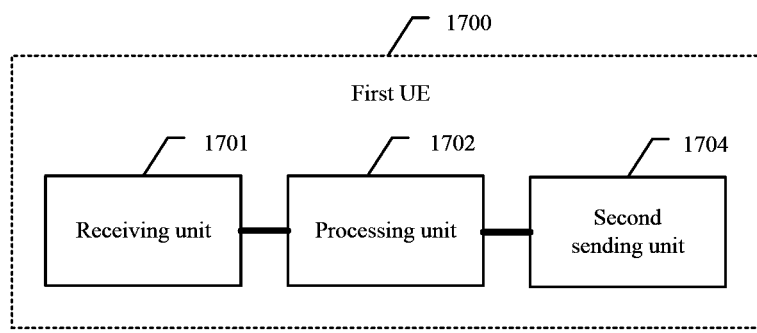
FIG. 17-c

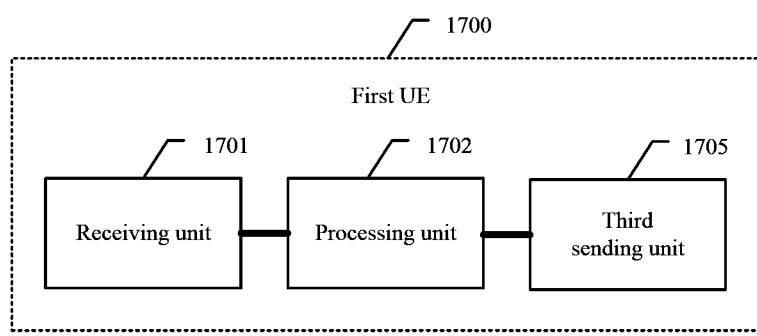
FIG. 17-d
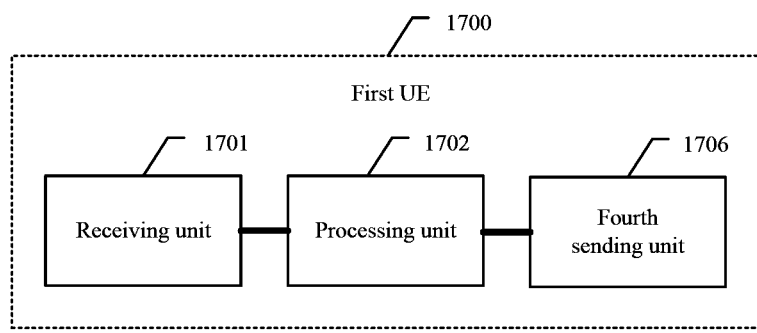
FIG. 17-e

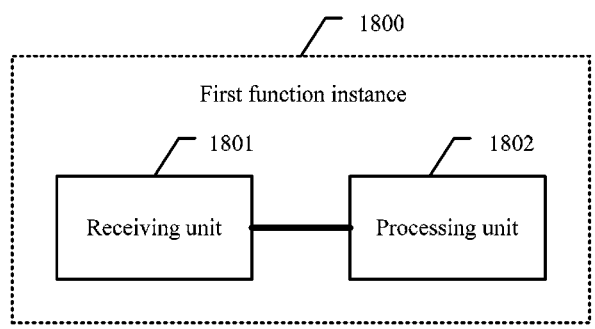
FIG. 18-a
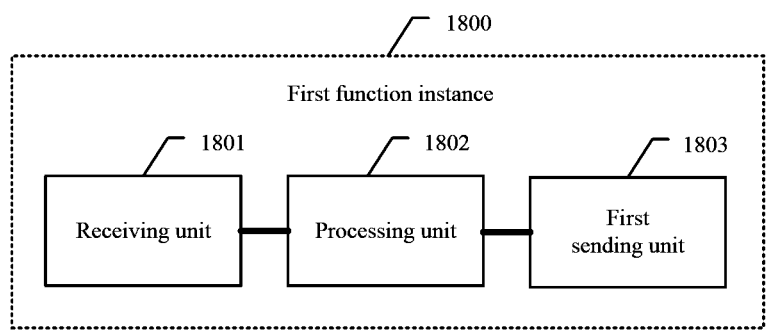
FIG. 18-b

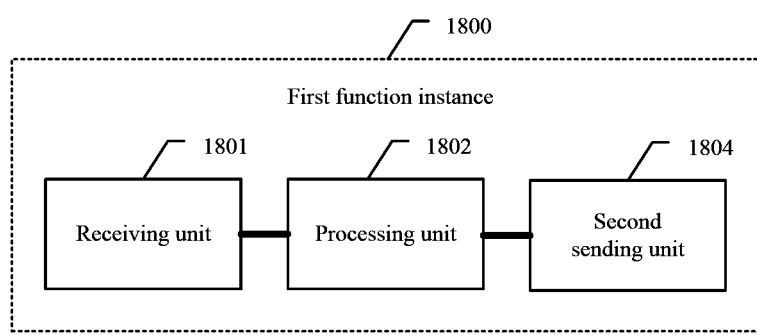
FIG. 18-c

COMMUNICATION CONTROL METHOD, CONTROLLER, USER EQUIPMENT, AND FUNCTION INSTANCE

CROSS-REFERENCE TO RELATED APPLICATIONS

This application is a continuation of International Application No. PCT/CN2016/097649, filed on Aug. 31, 2016, which claims priority to Chinese Patent Application No. 201510593669.0, filed on Sep. 17, 2015. The disclosures of the aforementioned applications are hereby incorporated by reference in their entireties.

TECHNICAL FIELD

Embodiments of the present disclosure relate to the communications field, and in particular, to a communication control method, a controller, user equipment, and a function instance.

BACKGROUND

With development of information technologies and communications technologies, various services emerge continuously, for example, high-throughput services represented by video services, Internet of things mass link services represented by smart metering and health care services, and delay-sensitive services represented by self-driving and the Internet of vehicles. Features and quality of service (QoS) requirements of these services differ greatly, and processing of corresponding service data in a corresponding communications network also differs greatly.

The QoS requirements of different services may differ greatly. In the corresponding communications network, the processing of the service data also differs greatly. For example, for some delay-sensitive services, when data packets are transmitted from a base station to a core network and then transmitted to an application server, a lot of delays are generated. Therefore, some functions of the core network and an application layer may be relocated to the base station to avoid these delays and ensure requirements of services on data packet transmission and processing delays.

Seen from the prior art, processing of service data in the communications network is completely consistent, and no differentiated capability is provided. An operator also cannot simultaneously provide massive and comprehensive highest-level support in all dimensions for all services, for example, simultaneously provide support in terms of high throughputs, mass links, and extremely short delays for metering, video, and self-driving. This is because, on the one hand, these redundant features are not mandatory for the services, and providing complete support cannot bring revenues for the operator; on the other hand, the support for multitudinous redundant features causes extremely great costs to the operator.

In the foregoing background, considering different service requirements and costs of the operator, the network operator need provide different processing mechanisms for different services. Currently, there is no communication control method, controller, user equipment, or function instance that can meet quality of service requirements of services with different requirements.

SUMMARY

Embodiments of the present disclosure provide a communication control method, a controller, user equipment, and a function instance that can meet quality of service requirements of services with different requirements.

According to a first aspect, an embodiment of the present disclosure provides a communication control method, including:

obtaining, by a controller, a first slice identifier corresponding to a first service;

determining, by the controller according to the first slice identifier, a first function instance corresponding to the first slice identifier; and separately sending, by the controller, to a first user equipment (UE) and the first function instance, instruction information for setting up a bearer, where the bearer is used to transmit a data packet of the first service corresponding to the first UE, the bearer corresponds to the first slice identifier, and the instruction information carries an identity of the first UE and an identity of the first function instance.

With reference to the first aspect, in a first possible implementation of the first aspect, the method further includes:

obtaining, by the controller, a correspondence between the service and a network slice, where the network slice corresponds to the slice identifier.

With reference to the first possible implementation of the first aspect, in a second possible implementation of the first aspect, the obtaining, by the controller, a correspondence between the service and a network slice includes:

receiving, by the controller, service information sent by a service provisioning server, where the service information includes a service identity corresponding to the service and a quality of service requirement required by the service, or the service information includes a service identity corresponding to the service, a quality of service requirement required by the service, and area coverage of the service;

deploying, by the controller, the function instance according to the service information, and setting up a correspondence between the function instance deployed for the service and the network slice; and setting up, by the controller, the correspondence between the service and the network slice according to the function instance deployed for the service.

With reference to the second possible implementation of the first aspect, in a third possible implementation of the first aspect, the method further includes:

sending, by the controller, the correspondence between the service and the network slice to the service provisioning server.

With reference to the first possible implementation of the first aspect, in a fourth possible implementation of the first aspect, the obtaining, by the controller, a correspondence between the service and a network slice includes:

obtaining, by the controller, the correspondence between the service and the network slice from a network slice deployment apparatus.

With reference to the first aspect, or the first or the second or the third or the fourth possible implementation of the first aspect, in a fifth possible implementation of the first aspect, the determining, by the controller according to the first slice identifier, a first function instance corresponding to the first slice identifier includes:

receiving, by the controller, an authentication request message sent by the first UE, where the authentication request message includes a first service identity corresponding to the first service of the first UE;

selecting, by the controller, a home subscriber server HSS according to the authentication request message;

receiving, by the controller, an authentication result that is sent by the HSS about identity authentication and slice authentication performed by the HSS for the first UE; and if the authentication result is that the identity authentication and slice authentication of the first UE are successful, determining, by the controller, the first function instance according to the first slice identifier.

With reference to the first aspect, or the first or the second or the third or the fourth possible implementation of the first aspect, in a sixth possible implementation of the first aspect, the obtaining, by a controller, a first slice identifier corresponding to a first service includes:

receiving, by the controller, an instance request message that is sent by a policy and charging enforcement function PCEF entity after the PCEF entity receives an authentication result sent by a policy and charging rules function PCRF entity about successful identity authentication and slice authentication of the first UE, where the instance request message includes the first slice identifier obtained by the PCEF entity from the authentication result; and the determining, by the controller according to the first slice identifier, a first function instance corresponding to the first slice identifier includes:

determining, by the controller, the first function instance according to the first slice identifier after the controller receives the instance request message.

With reference to the first or the second or the third or the fourth or the fifth or the sixth possible implementation of the first aspect, in a seventh possible implementation of the first aspect, the method further includes:

sending, by the controller, the correspondence between the service and the network slice to the HSS or the PCRF entity.

According to a second aspect, an embodiment of the present disclosure further provides a communication control method, including:

receiving, by first a user equipment (UE), instruction information for setting up a bearer corresponding to a first slice identifier, where the instruction information carries an identity of the first UE and an identity of the first function instance;

setting up, by the first UE according to the instruction information, the bearer between the first UE and the first function instance, for serving a first service of the first UE, where the first function instance corresponds to the first slice identifier; and transmitting, by the first UE, a data packet of the first service by using the bearer, where the data packet corresponds to the first slice identifier.

With reference to the second aspect, in a first possible implementation of the second aspect, the method further includes:

sending, by the first UE, an authentication request message to the controller, where the authentication request message includes a first service identity corresponding to the first service of the first UE.

With reference to the second aspect, in a second possible implementation of the second aspect, the method further includes:

sending, by the first UE, a service request message to a policy and charging enforcement function PCEF entity, where the service request message includes a first service identity corresponding to the first service of the first UE.

With reference to the second aspect, or the first or the second possible implementation of the second aspect, in a third possible implementation of the second aspect, the transmitting, by the first UE, a data packet of the first service by using the bearer includes:

sending, by the first UE, an uplink data packet to the first function instance by using the bearer, so that the first function instance processes the uplink data packet by using a processing resource and/or a transmission resource corresponding to the first slice identifier; and/or receiving, by the first UE by using the bearer, a downlink data packet that is sent by the first function instance after the first function instance processes the downlink data packet by using a processing resource and/or a transmission resource corresponding to the first slice identifier.

With reference to the second aspect, or the first or the second or the third possible implementation of the second aspect, in a fourth possible implementation of the second aspect, the method further includes:

sending, by the first UE, an uplink scheduling request to a first base station, where the uplink scheduling request includes the first slice identifier or a first connection identity corresponding to the data packet that the first UE needs to send; and receiving, by the first UE, resource assignment information sent by the first base station, where the resource assignment information includes the first slice identifier or the first connection identity, and the processing resource and/or the transmission resource corresponding to the first slice identifier or the first connection identity, and the processing resource and/or the transmission resource include/includes an air interface transmission resource.

According to a third aspect, an embodiment of the present disclosure further provides a communication control method, including:

receiving, by a first function instance, instruction information for setting up a bearer corresponding to a first slice identifier, where the instruction information carries an identity of a first UE and an identity of the first function instance;

setting up, by the first function instance according to the instruction information, the bearer between the first UE and the first function instance, for serving a first service of the first UE; and processing, by the first function instance by using a processing resource and/or a transmission resource corresponding to the first slice identifier, a data packet of the first service transmitted over the bearer, where the data packet of the first service corresponds to the first slice identifier.

With reference to the third aspect, in a first possible implementation of the third aspect, the first function instance includes at least one of a first gateway GW, or a first data plane function node, or a first base station.

With reference to the first possible implementation of the third aspect, in a second possible implementation of the third aspect, if the first function instance is the first base station, before the processing, by the first function instance by using a processing resource and/or a transmission resource corresponding to the first slice identifier, a data packet of the first service transmitted over the bearer, the method further includes:

receiving, by the first base station, an uplink scheduling request sent by the first UE, where the uplink scheduling request includes the first slice identifier or a first connection identity corresponding to the data packet that the UE needs to send;

allocating, by the first base station according to the uplink scheduling request, the processing resource and/or the transmission resource corresponding to the first slice identifier or the first connection identity, where the processing resource and/or the transmission resource include/includes an air interface transmission resource; and sending, by the first base station, resource assignment information to the first UE, where the resource assignment information includes the first slice identifier or the first connection identity, and the processing resource and/or the transmission resource corresponding to the first slice identifier or the first connection identity, and the processing resource and/or the transmission resource include/includes the air interface transmission resource.

With reference to the third aspect, or the first or the second possible implementation of the third aspect, in a third possible implementation of the third aspect, the processing, by the first function instance by using a processing resource and/or a transmission resource corresponding to the first slice identifier, a data packet of the first service transmitted over the bearer includes:

receiving, by the first function instance by using the bearer, an uplink data packet sent by the first UE, and processing, by the first function instance, the uplink data packet by using the processing resource and/or the transmission resource corresponding to the first slice identifier; and/or processing, by the first function instance, a downlink data packet by using the processing resource and/or the transmission resource corresponding to the first slice identifier, and then sending the processed downlink data packet to the first UE by using the bearer.

With reference to the third aspect, or the first or the second or the third possible implementation of the third aspect, in a fourth possible implementation of the third aspect, that the data packet of the first service corresponds to the first slice identifier includes:

when the first function instance includes the first gateway GW, an Internet Protocol IP quintuple in the downlink data packet received by the first GW corresponds to the first slice identifier; or when the first function instance includes the first data plane function node, at least one of an IP quintuple, a virtual local area network identity VLAN ID, a multiprotocol label switching MPLS label, or a bearer identity in the uplink data packet or the downlink data packet transmitted by the first data plane function node corresponds to the first slice identifier; or when the first function instance includes the first base station, at least one of a physical time-frequency resource, a user identity, or the connection identity used for the uplink data packet received by the first base station corresponds to the first slice identifier.

According to a fourth aspect, an embodiment of the present disclosure further provides a controller, including a sending unit and a processing unit, where the processing unit is configured to obtain a first slice identifier corresponding to a first service, and determine, according to the first slice identifier, a first function instance corresponding to the first slice identifier; and the sending unit is configured to separately send, to a first UE and the first function instance, instruction information for setting up a bearer, where the bearer is used to transmit a data packet of the first service corresponding to the first UE, the bearer corresponds to the first slice identifier, and the instruction information carries an identity of the first UE and an identity of the first function instance.

With reference to the fourth aspect, in a first possible implementation of the fourth aspect, the processing unit is further configured to obtain a correspondence between the service and a network slice, where the network slice corresponds to the slice identifier.

With reference to the first possible implementation of the fourth aspect, in a second possible implementation of the fourth aspect, the controller further includes a first receiving unit, where the first receiving unit is configured to receive service information sent by a service provisioning server, where the service information includes a service identity corresponding to the service and a quality of service requirement required by the service, or the service information includes a service identity corresponding to the service, a quality of service requirement required by the service, and area coverage of the service; and the processing unit is further configured to deploy the function instance according to the service information, set up a correspondence between the function instance deployed for the service and the network slice, and set up the correspondence between the service and the network slice according to the function instance deployed for the service.

With reference to the second possible implementation of the fourth aspect, in a third possible implementation of the fourth aspect, the sending unit is further configured to send the correspondence between the service and the network slice to the service provisioning server.

With reference to the first possible implementation of the fourth aspect, in a fourth possible implementation of the fourth aspect, the processing unit is further configured to obtain the correspondence between the service and the network slice from a network slice deployment apparatus.

With reference to the fourth aspect, or the first or the second or the third or the fourth possible implementation of the fourth aspect, in a fifth possible implementation of the fourth aspect, the controller further includes a second receiving unit, where the second receiving unit is configured to receive an authentication request message sent by the first UE, where the authentication request message includes a first service identity corresponding to the first service of the first UE;

the processing unit is configured to select a home subscriber server HSS according to the authentication request message;

the second receiving unit is further configured to receive an authentication result that is sent by the HSS about identity authentication and slice authentication performed by the HSS for the first UE; and the processing unit is configured to determine the first function instance according to the first slice identifier if the authentication result is that the identity authentication and slice authentication of the first UE are successful.

With reference to the fourth aspect, or the first or the second or the third or the fourth possible implementation of the fourth aspect, in a sixth possible implementation of the fourth aspect, the controller further includes a third receiving unit, where the third receiving unit is configured to receive an instance request message that is sent by a policy and charging enforcement function PCEF entity after the PCEF entity receives an authentication result sent by a policy and charging rules function PCRF entity about successful identity authentication and slice authentication of the first UE, where the instance request message includes the first slice identifier obtained by the PCEF entity from the authentication result; and the processing unit is configured to determine the first function instance according to the first slice identifier after the instance request message is received.

With reference to the first or the second or the third or the fourth or the fifth or the sixth possible implementation of the fourth aspect, in a seventh possible implementation of the fourth aspect, the sending unit is further configured to send the correspondence between the service and the network slice to the HSS or the PCRF entity.

According to a fifth aspect, an embodiment of the present disclosure further provides a UE, where the UE is first UE, and the first UE includes a receiving unit and a processing unit, where the receiving unit is configured to receive instruction information for setting up a bearer corresponding to a first slice identifier, where the instruction information carries an identity of the first UE and an identity of the first function instance; and the processing unit is configured to set up, according to the instruction information, the bearer between the first UE and the first function instance, for serving a first service of the first UE, where the first function instance corresponds to the first slice identifier; and transmit a data packet of the first service by using the bearer, where the data packet corresponds to the first slice identifier.

With reference to the fifth aspect, in a first possible implementation of the fifth aspect, the first UE further includes a first sending unit, where the first sending unit is configured to send an authentication request message to the controller, where the authentication request message includes a first service identity corresponding to the first service of the first UE.

With reference to the fifth aspect, in a second possible implementation of the fifth aspect, the first UE further includes a second sending unit, where the second sending unit is configured to send a service request message to a policy and charging enforcement function PCEF entity, where the service request message includes a first service identity corresponding to the first service of the first UE.

With reference to the fifth aspect, or the first or the second possible implementation of the fifth aspect, in a third possible implementation of the fifth aspect, the first UE further includes a third sending unit, where the third sending unit is configured to send an uplink data packet to the first function instance by using the bearer, so that the first function instance processes the uplink data packet by using a processing resource and/or a transmission resource corresponding to the first slice identifier; and/or the receiving unit is further configured to receive, by using the bearer, a downlink data packet that is sent by the first function instance after the first function instance processes the downlink data packet by using a processing resource and/or a transmission resource corresponding to the first slice identifier.

With reference to the fifth aspect, or the first or the second or the third possible implementation of the fifth aspect, in a fourth possible implementation of the fifth aspect, the first UE further includes a fourth sending unit, where the sending unit is configured to send an uplink scheduling request to a first base station before the processing unit transmits the data packet of the first service by using the bearer, where the uplink scheduling request includes the first slice identifier or a first connection identity corresponding to the data packet that the first UE needs to send; and the receiving unit is configured to receive resource assignment information sent by the first base station, where the resource assignment information includes the first slice identifier or the first connection identity, and the processing resource and/or the transmission resource corresponding to the first slice identifier or the first connection identity, and the processing resource and/or the transmission resource include/includes an air interface transmission resource.

According to a sixth aspect, an embodiment of the present disclosure provides a function instance, where the function instance is a first function instance, and the first function instance includes a receiving unit and a processing unit, where the receiving unit is configured to receive instruction information for setting up a bearer corresponding to a first slice identifier, where the instruction information carries an identity of first UE and an identity of the first function instance; and the processing unit is configured to set up, according to the instruction information, the bearer between the first UE and the first function instance, for serving a first service of the first UE, and process, by using a processing resource and/or a transmission resource corresponding to the first slice identifier, a data packet of the first service transmitted over the bearer, where the data packet of the first service corresponds to the first slice identifier.

With reference to the sixth aspect, in a first possible implementation of the sixth aspect, the first function instance includes at least one of a first gateway GW, or a first data plane function node, or a first base station.

With reference to the first possible implementation of the sixth aspect, in a second possible implementation of the sixth aspect, if the first function instance is the first base station, the first base station further includes a first sending unit, where the receiving unit is further configured to receive, before the processing unit processes, by using the processing resource and/or the transmission resource corresponding to the first slice identifier, the data packet of the first service transmitted over the bearer, an uplink scheduling request sent by the first UE, where the uplink scheduling request includes the first slice identifier or a first connection identity corresponding to the data packet that the first UE needs to send;

the processing unit is further configured to allocate, according to the uplink scheduling request, the processing resource and/or the transmission resource corresponding to the first slice identifier or the first connection identity, where the processing resource and/or the transmission resource include/includes an air interface transmission resource; and the first sending unit is configured to send resource assignment information to the first UE, where the resource assignment information includes the first slice identifier or the first connection identity, and the processing resource and/or the transmission resource corresponding to the first slice identifier or the first connection identity, and the processing resource and/or the transmission resource include/includes the air interface transmission resource.

With reference to the sixth aspect, or the first or the second possible implementation of the sixth aspect, in a third possible implementation of the sixth aspect, the first function instance further includes a second sending unit, where the receiving unit is configured to receive, by using the bearer, an uplink data packet sent by the first UE; and the processing unit is configured to process the uplink data packet by using the processing resource and/or the transmission resource corresponding to the first slice identifier; and/or the processing unit is configured to process a downlink data packet by using the processing resource and/or the transmission resource corresponding to the first slice identifier; and the second sending unit is configured to send the processed downlink data packet to the first UE by using the bearer.

With reference to the sixth aspect, or the first or the second or the third possible implementation of the sixth aspect, in a fourth possible implementation of the sixth aspect, that the data packet of the first service corresponds to the first slice identifier includes:

when the first function instance includes the first gateway GW, an Internet Protocol IP quintuple in the downlink data packet received by the first GW corresponds to the first slice identifier; or when the first function instance includes the first data plane function node, at least one of an IP quintuple, a virtual local area network identity VLAN ID, a multiprotocol label switching MPLS label, or a bearer identity in the uplink data packet or the downlink data packet transmitted by the first data plane function node corresponds to the first slice identifier; or when the first function instance includes the first base station, at least one of a physical time-frequency resource, a user identity, or the connection identity used for the uplink data packet received by the first base station corresponds to the first slice identifier.

As can be seen from the foregoing technical solutions, the embodiments of the present disclosure have the following advantages:

In the embodiments of the present disclosure, a controller first obtains a first slice identifier corresponding to a first service; then the controller determines, according to the first slice identifier, a first function instance corresponding to the first slice identifier; and the controller separately sends, to first UE and the first function instance, instruction information for setting up a bearer, where the bearer is used to transmit a data packet of the first service corresponding to the first UE. In the embodiments of the present disclosure, the controller can determine, according to the first slice identifier obtained by the controller, the first function instance corresponding to the first slice identifier. For example, the first UE requests the controller to allocate a function instance, and a slice identifier corresponding to the first UE is the first slice identifier, or a slice identifier corresponding to the first service initiated by the first UE is the first slice identifier. The controller can obtain the corresponding first function instance according to the first slice identifier, and different function instances can provide different processing functions by using processing resources and/or transmission resources corresponding to different slice identities. In the embodiments of the present disclosure, a corresponding function instance is selected according to a slice identifier. Therefore, different function instances can provide differentiated processing functions according to service requirements by using different processing resources and/or transmission resources, and differentiated services can be provided for different user equipments and different services.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons skilled in the art may still derive other drawings from these accompanying drawings.

FIG. 12-*a* is a schematic general flowchart of a data packet processing procedure according to an embodiment of the present disclosure;

FIG. 12-*b* is a schematic diagram of an implementation of network slice deployment according to an embodiment of the present disclosure;

FIG. 12-*c* is a schematic diagram of an association process between a service and a network slice according to an embodiment of the present disclosure;

FIG. 12-*d* is a schematic diagram of an association process between a service and a network slice according to an embodiment of the present disclosure;

FIG. 12-*e* is a schematic diagram of a downlink data packet processing procedure according to an embodiment of the present disclosure;

FIG. 12-*f* is a schematic diagram of an uplink data packet processing procedure according to an embodiment of the present disclosure;

FIG. 12-*g* is a schematic diagram of an air interface transmission resource allocation process implemented between first UE and a first base station according to an embodiment of the present disclosure;

FIG. 13-*a* is a schematic structural diagram of a controller according to an embodiment of the present disclosure;

FIG. 13-*b* is a schematic structural diagram of another controller according to an embodiment of the present disclosure;

FIG. 13-c is a schematic structural diagram of an obtaining module according to an embodiment of the present disclosure;

FIG. 13-d is a schematic structural diagram of another controller according to an embodiment of the present disclosure;

FIG. 14-a is a schematic structural diagram of first UE according to an embodiment of the present disclosure;

FIG. 14-b is a schematic structural diagram of another first UE according to an embodiment of the present disclosure;

FIG. 15-a is a schematic structural diagram of a first function instance according to an embodiment of the present disclosure;

FIG. 15-b is a schematic structural diagram of another first function instance according to an embodiment of the present disclosure;

FIG. 16-a is a schematic structural diagram of another controller according to an embodiment of the present disclosure;

FIG. 16-b is a schematic structural diagram of another controller according to an embodiment of the present disclosure;

FIG. 16-c is a schematic structural diagram of another controller according to an embodiment of the present disclosure;

FIG. 16-d is a schematic structural diagram of another controller according to an embodiment of the present disclosure;

FIG. 17-a is a schematic structural diagram of another first UE according to an embodiment of the present disclosure;

FIG. 17-b is a schematic structural diagram of another first UE according to an embodiment of the present disclosure;

FIG. 17-c is a schematic structural diagram of another first UE according to an embodiment of the present disclosure;

FIG. 17-d is a schematic structural diagram of another first UE according to an embodiment of the present disclosure;

FIG. 17-e is a schematic structural diagram of another first UE according to an embodiment of the present disclosure;

FIG. 18-a is a schematic structural diagram of another first function instance according to an embodiment of the present disclosure;

FIG. 18-b is a schematic structural diagram of another first function instance according to an embodiment of the present disclosure; and FIG. 18-c is a schematic structural diagram of another first function instance according to an embodiment of the present disclosure.

DESCRIPTION OF EMBODIMENTS

Embodiments of the present disclosure provide a communication control method, a controller, user equipment, and a function instance that can meet quality of service requirements of services with different requirements.

To make the disclosure objectives, features, and advantages of the present disclosure clearer and more comprehensible, the following clearly describes the technical solutions in the embodiments of the present disclosure with reference to the accompanying drawings in the embodiments of the present disclosure. Apparently, the embodiments described in the following are merely a part rather than all of the embodiments of the present disclosure. All other embodiments obtained by persons skilled in the art based on the embodiments of the present disclosure shall fall within the protection scope of the present disclosure.

In the specification, claims, and accompanying drawings of the present disclosure, the terms "first" and the like are intended to distinguish between similar objects. "First" merely specifies an object or a type of object, but does not necessarily indicate a position in a specific order or sequence. It should be understood that the terms used in such a way are interchangeable in proper circumstances, which is merely a discrimination manner that is used when objects having a same attribute are described in the embodiments of the present disclosure. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
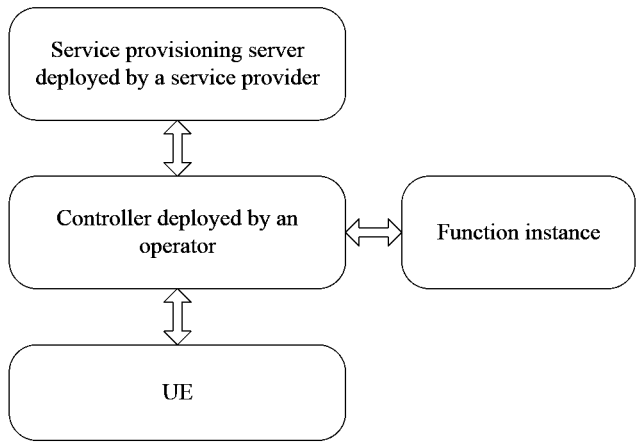
FIG. 1 is a schematic diagram of structural relationships between a controller, a service provisioning server, user equipment, and a function instance according to an embodiment of the present disclosure.

First, various method execution entities in a communication control method provided by an embodiment of the present disclosure are described. As shown in FIG. 1, FIG. 1 is a schematic diagram of structural relationships between a controller, a service provisioning server, user equipment, and a function instance according to an embodiment of the present disclosure. The controller may be deployed on an operator side. The controller determines a function instance for the UE. The function instance provides a processing resource and/or a transmission resource for the UE. A service provider provides service support for the UE. The communication control method provided by this embodiment of the present disclosure is applicable to a case in which a service requirement is clear and a service requirement type is definite. The service provisioning server is located above the operator, and is configured to provide various application services for the user equipment. The operator is configured to provide wireless network access. Examples of operators are Mobile, Unicom, and Telecom.

The execution entities mentioned in this embodiment of the present disclosure include at least a controller, a function instance, and UE. The controller may be configured to determine a function instance according to a correspondence between a slice identifier and the function instance, allocate, to the UE, a first function instance corresponding to a first slice identifier, and trigger the UE to set up a bearer with the selected first function instance. The UE is configured to request the controller to allocate the function instance, and when triggered by the controller, set up the bearer, and transmit a data packet by using the bearer that is set up. When selected by the controller and triggered by the controller, the first function instance is configured to set up the bearer, and by using a processing resource and/or a transmission resource corresponding to the first slice identifier, provide a processing function corresponding to the first function instance.

As a whole, from raising a requirement to providing a service for a service of a user by a network slice, the following steps may be included:

Firstly, an operator deploys, in a network according to a requirement of a service, a network slice providing service support for the service. The network slice includes various required function instances and corresponding processing resources and/or transmission resources. A network slice deployment process is irrelevant to a user.

Secondly, when a user initiates the service, a controller determines the network slice corresponding to the service, sets up a bearer for the service on a function instance corresponding to the network slice, and sets up a correspondence between the service and the network slice.

Finally, in a service data transmission process of the user, the function instance finds the corresponding network slice according to a correspondence between a data packet feature and the network slice, established during setup of the bearer, and provides data processing for service data according to slice information.

In a virtual operator scenario, differentiated processing of authentication, authorization, and accounting is provided for a user in an authentication, authorization, and accounting step during user access, but an infrastructure provided by an infrastructure operator is shared in transmission of service data of all virtual operators. Obviously, this cannot meet quality of service requirements of different services. The communication control method provided by this embodiment of the present disclosure and the prior art are applicable to different application scenarios, and use completely different technical means. Specifically, an application scenario of the present disclosure is different from that of the prior art. In this embodiment of the present disclosure, differentiated authentication is provided not in a step of network access of the user but in a step of data packet processing. In addition, technical means used in the present disclosure and the prior art are different. In this embodiment of the present disclosure, according to different service requirements, different network slices corresponding to different services are obtained, but different network slices respectively correspond to different function instances, and different function instances provide different processing functions by using different processing resources and/or transmission resources. Therefore, in this embodiment of the present disclosure, specific service functions, specific quality of service requirements, and specific quality of experience requirements can be met. Therefore, differentiated data packet processing services can be provided for different user equipments and different services.

Figure 2:
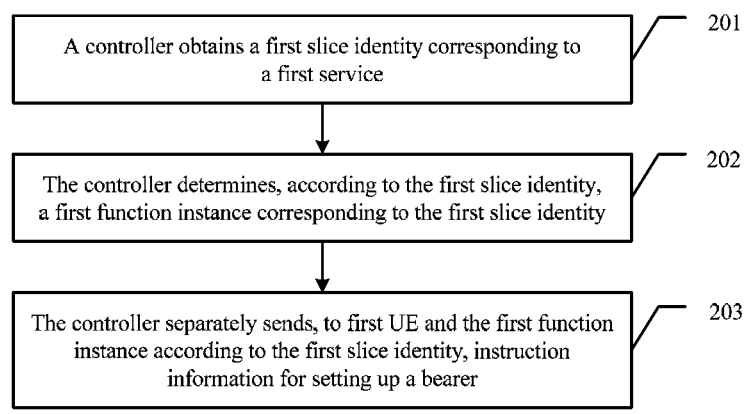
FIG. 2 is a schematic block flowchart of a communication control method according to an embodiment of the present disclosure.

The following first describes, from a controller side, a communication control method provided by an embodiment of the present disclosure. Referring to FIG. 2, a communication control method provided by an embodiment of the present disclosure may include the following steps.

201. A controller obtains a first slice identifier corresponding to a first service.

202. The controller determines, according to the first slice identifier, a first function instance corresponding to the first slice identifier.

In this embodiment of the present disclosure, the controller first obtains the first slice identifier corresponding to the first service of first UE. A correspondence between the slice identifier and the function instance is preset in the controller, or the controller obtains a correspondence between the slice identifier and the function instance from a network. After the controller obtains the first slice identifier, the controller first obtains the first function instance. The first function instance may include one or more function instances, and different function instances provide different processing functions by using different processing resources and/or transmission resources. Specifically, a service identity of the first service initiated by the first UE corresponds to the slice identifier, and the slice identifier corresponds to an instance identity of the function instance.

It should be noted that, the first service may be an actual service initiated by the first UE. The first service may also be a preconfigured service directly associated with the first UE. A specific implementation of the first service depends on an application scenario, and is only for description herein, but is not intended to limit the present disclosure.

203. The controller separately sends, to first UE and the first function instance according to the first slice identifier, instruction information for setting up a bearer.

The bearer is used to transmit a data packet of the first service corresponding to the first UE, the bearer corresponds to the first slice identifier, and the instruction information carries an identity of the first UE and an identity of the first function instance.

In this embodiment of the present disclosure, after the controller selects the first function instance for the first UE, the controller determines that the first function instance provides a data packet processing function for the first UE by using a processing resource and/or a transmission resource. The controller controls the first UE and the first function instance to set up the bearer. Specifically, the controller separately sends, to the first UE and the first function instance, the instruction information for setting up the bearer. The bearer is used to transmit the data packet of the first service corresponding to the first UE, and the bearer corresponds to the first network slice having the first slice identifier. The bearer that the controller instructs the first UE and the first function instance to set up is used to transmit the data packet of the first service corresponding to the first UE. Therefore, the bearer is identified by using the first slice identifier. After the first UE and the first function instance receive the instruction information of the controller, the first UE and the first function instance respectively perform a bearer setup process. For a specific manner of setting up a bearer, refer to the prior art. Details are not described herein.

As can be known from the description of the present disclosure in the foregoing embodiment, the controller may obtain the corresponding first function instance according to the first slice identifier, and different function instances can provide different processing functions by using processing resources and/or transmission resources corresponding to different slice identities. In this embodiment of the present disclosure, a corresponding function instance is selected according to a slice identifier. Therefore, different function instances can provide differentiated processing functions according to service requirements by using different processing resources and/or transmission resources, and differentiated services can be provided for different user equipments and different services.

Figure 3:
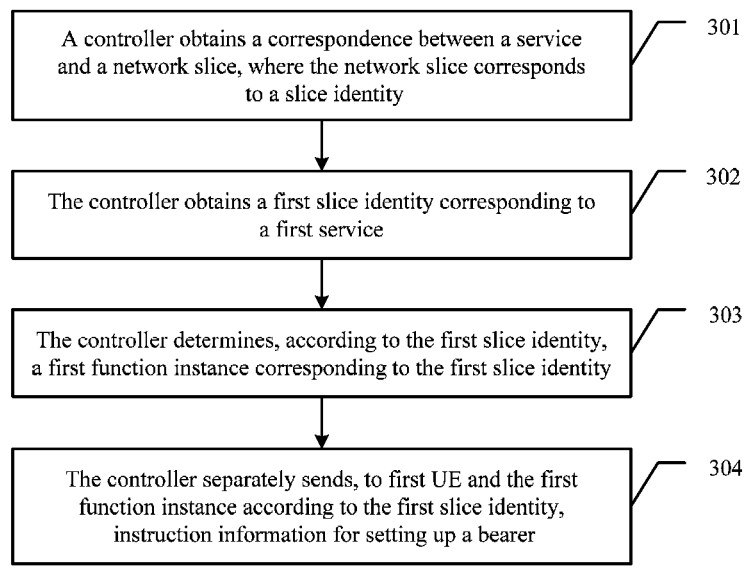
FIG. 3 is a schematic block flowchart of another communication control method according to an embodiment of the present disclosure.

The following describes, from a controller side, another communication control method provided by an embodiment of the present disclosure. Referring to FIG. 3, a communication control method provided by an embodiment of the present disclosure may include the following steps.

301. A controller obtains a correspondence between a service and a network slice, where the network slice corresponds to a slice identifier.

302. The controller obtains a first slice identifier corresponding to a first service.

303. The controller determines, according to the first slice identifier, a first function instance corresponding to the first slice identifier.

304. The controller separately sends, to first UE and the first function instance according to the first slice identifier, instruction information for setting up a bearer.

The bearer is used to transmit a data packet of the first service corresponding to the first UE, the bearer corresponds to the first slice identifier, and the instruction information carries an identity of the first UE and an identity of the first function instance.

An implementation of step 302 is similar to that of step 201 in the foregoing embodiment. An implementation of step 303 is similar to that of step 202 in the foregoing embodiment. An implementation of step 304 is similar to that of step 203 in the foregoing embodiment. Details are not described again herein. The following describes step 301 in detail.

In this embodiment of the present disclosure, the controller may be deployed by an operator. The operator provides service support for a service provider. The controller sets up a correspondence between a service and a network slice according to a service requirement. The correspondence between a service and a network slice in step 301 generally refers to correspondences between all services and different network slices. The network slice may be a set of function instances and transmission resources and processing resources for meeting a specific service requirement. For different service requirements, the controller needs to set up different network slices.

Different network slices may have different protocol stack processing procedures. Each network slice corresponds to one or more function instances, and different function instances can provide different processing functions by using different processing resources and/or transmission resources. That is, each function instance has a corresponding processing resource, or has a corresponding transmission resource, or has a corresponding processing resource and transmission resource. One network slice corresponds to one or more function instances. Therefore, according to a network slice, a processing resource and/or a transmission resource used by a function instance corresponding to the network slice can be determined.

The processing resource and the transmission resource may provide specific processing functions for a service. The processing resource may correspond to a computing resource such as a central processing unit (CPU) or a core, and the transmission resource may correspond to a network bandwidth resource or the like. For example, when a function instance is a base station, the transmission resource may be an air interface transmission resource. Processing resources and/or transmission resources used by different function instances are different. For example, function instances may include a base station, a gateway (GW), and a data plane function (DPFn) node. When the function instances represent different entities, processing resources and/or transmission resources corresponding to the function instances may be different.

It should be noted that, in this embodiment of the present disclosure, the network slice may be set up in a flexible manner. For example, different network slices may be set based on different speeds, capacities, and coverage. Different network slices may meet a specific requirement of each specific service. The network slice includes a connection service implemented by multiple customizable software-defined functions. For example, a specific network slice may be set up according to one or more of these service requirements: coverage of a management area, duration, capacity, speed, delay, robustness, security, or availability.

In this embodiment of the present disclosure, a service requirement is a specific requirement of a service for a processing resource and/or a transmission resource. When services are different, specific service requirements of the services are different. When service requirements are different, it may also be considered that services are different. For example, a service may be a mass metering service or a motion sensing game or the like in machine type communication (MTC). Different services determine that the services have different requirements for the processing resources and/or transmission resources.

In some embodiments of the present disclosure, before a user equipment (UE) initiates a service, the controller may obtain correspondences between multiple services and network slices in advance. Specifically, in some embodiments of the present disclosure, step 301 in which the controller obtains the correspondence between the service and the network slice may include the following steps.

A1. The controller receives service information sent by a service provisioning server, where the service information includes a service identity corresponding to the service and a quality of service requirement required by the service, or the service information includes a service identity corresponding to the service, a quality of service requirement required by the service, and area coverage of the service.

A2. The controller deploys the function instance according to the service information, and sets up a correspondence between the function instance deployed for the service and the network slice.

A3. The controller sets up the correspondence between the service and the network slice according to the function instance deployed for the service.

In this embodiment of the present disclosure, that the controller deployed by the operator sets up the correspondence between the service and the network slice by using the service provisioning server deployed by the service provider is described in step A1 to step A3. The service provisioning server deployed by the service provider sends the service information to the controller. If multiple different services are set on the service provisioning server, the service information sent by the service provisioning server to the controller may include service information of different services.

Each piece of service information includes a service identity corresponding to a service and a quality of service requirement required by the service. In addition to the identity corresponding to the service and the quality of service requirement required by the service, the service information may further include area coverage of the service. The area coverage of the service is a geographical area in which the service deployment is effective. The controller deploys a function instance according to the service requirement of each service in the service information. For some service requirements, only one function instance needs to be deployed, but for some service requirements, two or more function instances need to be deployed. After the controller deploys the function instance, the controller enables the function instance that is set up to belong to the corresponding network slice, and therefore sets up a correspondence between the function instance and the network slice, and finally, associates the service with the network slice according to the deployed function instance. Therefore, setup of the correspondence between the service and the network slice can be completed.

For example, three services, which are a service a, a service b, and a service c respectively, are set on the service provisioning server. Service information a of the service a includes a service identity a' corresponding to the service a, a quality of service requirement required by the service a, and area coverage of the service a. Service information b of the service b includes a service identity b' corresponding to the service b, a quality of service requirement required by the service b, and area coverage of the service b. Service information c of the service c includes a service identity c' corresponding to the service c, a quality of service requirement required by the service c, and area coverage of the service c. After the controller receives the service information of the three services that is sent by the service provisioning server, the controller may separately deploy function instances for the three services, and set up correspondences between the function instances and network slices. For example, the controller deploys a function instance 1 and a function instance 2 for the service a according to a service requirement of the service a. In this case, the function instance 1 and the function instance 2 deployed for the service a correspond to a network slice x, and the controller may set up a correspondence between the function instance 1, the function instance 2, and the network slice x. The controller deploys a function instance 3 for the service b according to a service requirement of the service b. In this case, the function instance 3 deployed for the service b corresponds to a network slice y. The controller may set up a correspondence between the function instance 3 and the network slice y. The controller deploys a function instance 4, a function instance 5, and a function instance 6 according to a service requirement of the service c. In this case, the function instance 4, the function instance 5, and the function instance 6 that are deployed for the service c correspond to a network slice z. The controller may set up a correspondence between the function instance 4, the function instance 5, the function instance 6, and the network slice z. By deploying different function instances, the controller sets up a correspondence between the service a and the network slice x, the controller sets up a correspondence between the service b and the network slice y, and the controller sets up a correspondence between the service c and the network slice z. Each of a, b, c, 1, 2, x, y, and z is used to identify a specific object to distinguish from other objects. As can be known from the foregoing example, the correspondences between the network slices and the function instances deployed by the controller for the services may be shown in the following Table 1.

TABLE 1

Table of correspondences between the services, function instances, and network slices

| Service name | Function instance | Network slice |
|---|---|---|
| Service a | Function instance 1 and function instance 2 | Network slice x |
| Service b | Function instance 3 | Network slice y |
| Service c | Function instance 4, function instance 5, and function instance 6 | Network slice z |

It should be noted that, in the foregoing example, three services are used as an example. In an actual application, according to the implementation in the foregoing example, the controller may separately deploy function instances for more services, and set up correspondences between different services and network slices. In addition, an application scenario of setting up a correspondence between a service and a network slice is described in the foregoing steps A1 to A3. The controller in this embodiment of the present disclosure may further set up the correspondence between the service and the network slice in another manner. This is not limited. For example, the controller preconfigures multiple types of service information. The controller groups all function instances into multiple function instance groups in advance. Each function instance group includes one or more function instances, and each function instance group corresponds to one network slice. Then the controller matches the function instance groups with specific service information. A function instance group that can be matched successfully may be a network slice corresponding to a service. In this way, the controller may set up correspondences between different services and different network slices.

In the implementation scenario of performing the foregoing steps A1 to A3 in this embodiment of the present disclosure, after the controller obtains the correspondence between the service and the network slice in step 301, the communication control method provided by this embodiment of the present disclosure may further include the following step.

B1. The controller sends the correspondence between the service and the network slice to the service provisioning server.

The service provisioning server deployed by the service provider may receive the correspondence between the service and the network slice that is sent by the controller. That the controller sends the correspondence between the service and the network slice to the service provisioning server may be that the controller sends a correspondence between the service identity of the service and the slice identifier of the network slice to the service provisioning server. When the user equipment initiates different services, the service provisioning server may obtain, according to correspondences between the services and network slices, slice identities of corresponding network slices for the services initiated by the user equipment.

For example, when the user equipment subscribes to the service provider, the service provider allocates, by using the service provisioning server, a slice identifier to the service initiated by the user equipment, or when the user equipment subscribes to the service provider, the service provider allocates a slice identifier to the user equipment by using the service provisioning server. In this embodiment of the present disclosure, the same user equipment may use the same slice identifier, or the same user equipment may use different slice identities according to different services of the same user equipment. Therefore, whether the service provisioning server allocates one slice identifier or multiple slice identities to the user equipment may be determined flexibly according to a requirement of an application scenario.

In other embodiments of the present disclosure, step 301 in which the controller obtains the correspondence between the service and the network slice may include the following step.

C1. The controller obtains the correspondence between the service and the network slice from a network slice deployment apparatus.

That the network slice deployment apparatus sets up the correspondence between the service and the network slice includes:

the network slice deployment apparatus receives service information sent by a service provisioning server, where the service information includes a service identity corresponding to the service and a quality of service requirement required by the service, or the service information includes a service identity corresponding to the service, a quality of service requirement required by the service, and area coverage of the service;

the network slice deployment apparatus deploys the function instance according to the service information, and sets up a correspondence between the function instance deployed for the service and the network slice; and the network slice deployment apparatus sets up the correspondence between the service and the network slice according to the function instance deployed for the service, and sends the correspondence between the service and the network slice to the controller.

The network slice deployment apparatus may be built in the controller, or the network slice deployment apparatus may be independent of the controller. The network slice deployment apparatus is a functional apparatus dedicated to setting up a network slice. In this implementation scenario, the network slice apparatus sets up the correspondence between the service and the network slice by using the service information provided by the service provisioning server. The service provisioning server sends the service information to the network slice deployment apparatus. If multiple different services are set on the service provisioning server, the service information sent by the service provisioning server to the network slice deployment apparatus may include service information of the multiple different services.

Each piece of service information includes a service identity corresponding to a service and a quality of service requirement required by the service. In addition to the identity corresponding to the service and the quality of service requirement required by the service, the service information may further include area coverage of the service. The area coverage of the service is a geographical area in which the service deployment is effective. The network slice deployment apparatus deploys a function instance according to a service requirement of each service in the service information. For some service requirements, only one function instance needs to be deployed, but for some service requirements, two or more function instances need to be deployed. After the network slice deployment apparatus deploys the function instance, the network slice deployment apparatus enables the function instance that is set up to belong to the corresponding network slice, and therefore sets up a correspondence between the function instance and the network slice, and finally, associates the service with the network slice according to the deployed function instance. Therefore, setup of the correspondence between the service and the network slice can be completed. The network slice deployment apparatus may send the correspondence between the service and the network slice to the controller for use by the controller.

The following describes the foregoing step 302 and step 303 by using an example. In an implementation scenario in which the first slice identifier corresponds to the first user equipment, the slice identifier used by the first user equipment is the first slice identifier, and different user equipments may use different slice identities. For example, the first user equipment corresponds to a slice identifier x, and the second user equipment corresponds to a slice identifier y. In this case, the controller selects, according to the slice identifier x, a function instance 1 and a function instance 2 corresponding to the slice identifier x. The controller selects, according to the slice identifier y, a function instance 3 corresponding to the slice identifier y. That is, the controller may provide differentiated services for multiple user equipments according to different slice identities used by different user equipments. In an implementation scenario in which the first slice identifier corresponds to the service initiated by the first user equipment, when the first user equipment initiates multiple services, different services initiated by the first user equipment correspond to different slice identities, and the controller may allocate different function instances for the different services initiated by the first user equipment. For example, the first user equipment initiates two services (a service a and a service b, respectively), the service a initiated by the first user equipment corresponds to a slice identifier x, and the service b initiated by the first user equipment corresponds to a slice identifier y. In this case, the controller selects, according to the slice identifier x, a function instance 1 and a function instance 2 corresponding to the slice identifier x, and the controller selects, according to the slice identifier y, a function instance 3 corresponding to the slice identifier y. Therefore, in this embodiment of the present disclosure, the controller may configure different function instances for different user equipments, and therefore may provide differentiated services for different user equipments. In addition, in this embodiment of the present disclosure, the controller may further configure different function instances for different services of the same user equipment, and therefore may provide differentiated services for different services of the same user equipment.

It should be noted that, in this embodiment of the present disclosure, the controller obtains the correspondence between the service and the network slice in advance. The controller side stores the correspondence between the slice identifier of the network slice and the instance identity of the function instance. The function instance selected by the controller for the first user equipment or the service initiated by the first user equipment is the first function instance. The first function instance may be one or more function instances. This is not limited herein. After the controller selects the first function instance according to the first slice identifier, that is, after the controller determines that the first function instance provides a processing function for the first user equipment by using a processing resource and/or a transmission resource, the controller instructs the first function instance to prepare for providing the processing function for the first user equipment.

Figure 4:
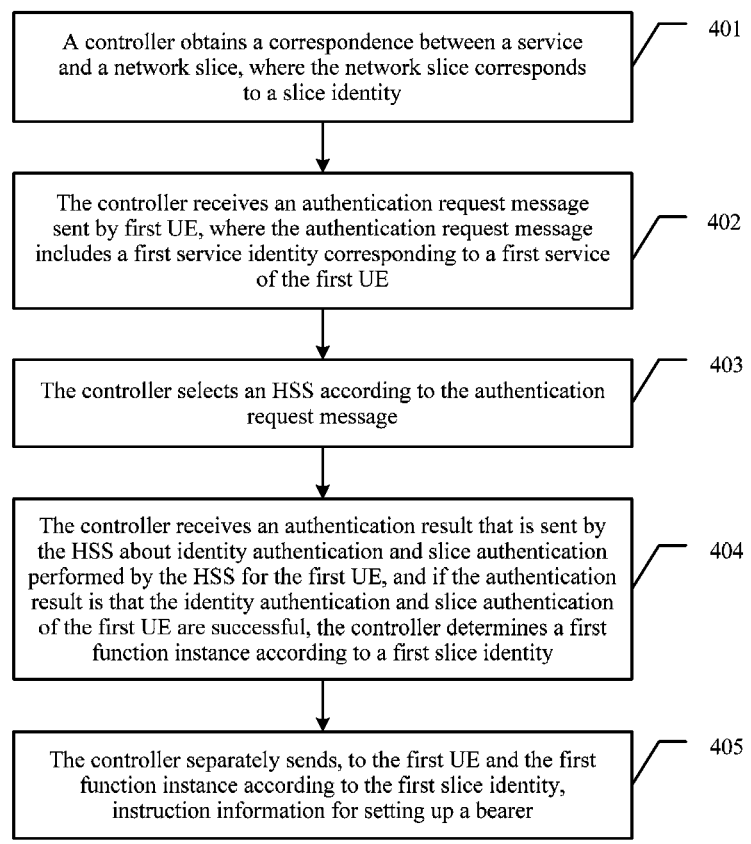
FIG. 4 is a schematic block flowchart of another communication control method according to an embodiment of the present disclosure.

The following describes, from a controller side, another communication control method provided by an embodiment of the present disclosure. Referring to FIG. 4, a communication control method provided by an embodiment of the present disclosure may include the following steps.

401. A controller obtains a correspondence between a service and a network slice, where the network slice corresponds to a slice identifier.

402. The controller receives an authentication request message sent by first UE, where the authentication request message includes a first service identity corresponding to a first service of the first UE.

403. The controller selects a home subscriber server (HSS) according to the authentication request message, where the HSS may be configured to perform identity authentication and slice authentication for the first UE.

404. The controller receives an authentication result that is sent by the HSS about identity authentication and slice authentication performed by the HSS for the first UE, and if the authentication result is that the identity authentication and slice authentication of the first UE are successful, the controller determines a first function instance according to a first slice identifier.

405. The controller separately sends, to the first UE and the first function instance according to the first slice identifier, instruction information for setting up a bearer.

The bearer is used to transmit a data packet of the first service corresponding to the first UE, the bearer corresponds to the first slice identifier, and the instruction information carries an identity of the first UE and an identity of the first function instance.

An implementation of step 401 is similar to that of step 301 in the foregoing embodiment. An implementation of step 404 is similar to that of step 202 in the foregoing embodiment. An implementation of step 405 is similar to that of step 203 in the foregoing embodiment. Details are not exhaustively described herein. The following describes step 402 and step 403 in detail.

In an application scenario of supporting authentication and slice authentication for the user equipment in this embodiment of the present disclosure, the controller first needs to perform identity authentication and slice authentication for the first UE before allocating the function instance to the first UE. Step 404 in which the controller determines the first function instance according to the first slice identifier can be performed only when the identity authentication and slice authentication of the first UE are successful. If the identity authentication and slice authentication of the first UE are not successful, the controller does not need to allocate the function instance to the first UE, to avoid use of a processing resource and/or a transmission resource by illegal user equipment. In the application scenario of step 402 to step 404, the controller selects the HSS according to the authentication request message of the first UE, and the HSS performs identity authentication and slice authentication for the first UE. The first UE may add the first slice identifier to the authentication request message sent by the first UE, so that the HSS performs identity authentication and slice authentication for the first UE. Alternatively, the first UE may not add the first slice identifier to the authentication request message sent by the first UE. After the HSS successfully performs identity authentication and slice authentication for the first UE, the authentication result sent by the HSS to the controller carries the first slice identifier corresponding to the first UE, or the first slice identifier corresponding to the service initiated by the first UE.

It should be noted that, in the foregoing embodiment of the present disclosure, after step 401 in which the controller obtains the correspondence between the service and the network slice, the communication control method provided by this embodiment of the present disclosure may further include the following step.

D1. The controller sends the correspondence between the service and the network slice to the HSS, so that the HSS performs slice authentication for the UE according to the correspondence between the service and the network slice.

In an application scenario of supporting authentication and slice authentication for the user equipment in this embodiment of the present disclosure, after step 401 is performed, the foregoing step D1 further needs to be triggered for execution. That the controller sends the correspondence between the service and the network slice to the HSS may be that the controller sends the correspondence between the service identity of the service and the slice identifier of the network slice to the HSS. In this case, when the user equipment initiates different services, the HSS may provide identity authentication and slice authentication for the user equipment according to the correspondence between the service and the network slice, to determine whether the identity of the user equipment is legal and whether the user equipment is authorized to use the network slice.

Figure 5:
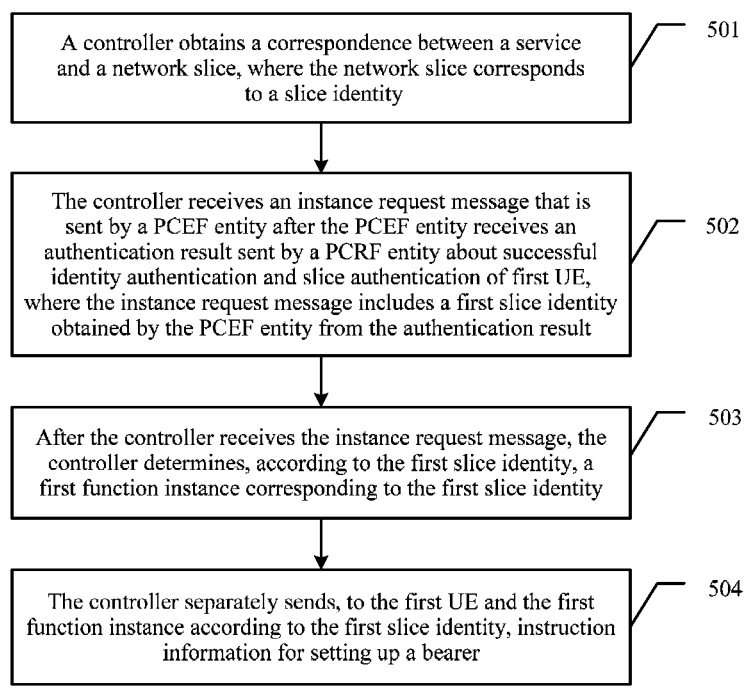
FIG. 5 is a schematic block flowchart of another communication control method according to an embodiment of the present disclosure.

The following describes, from a controller side, another communication control method provided by an embodiment of the present disclosure. Referring to FIG. 5, a communication control method provided by an embodiment of the present disclosure may include the following steps.

501. A controller obtains a correspondence between a service and a network slice, where the network slice corresponds to a slice identifier.

502. The controller receives an instance request message that is sent by a policy and charging enforcement function (PCEF) entity after the PCEF entity receives an authentication result sent by a policy and charging rules function (PCRF) entity about successful identity authentication and slice authentication of first UE, where the instance request message includes a first slice identifier obtained by the PCEF entity from the authentication result.

503. After the controller receives the instance request message, the controller determines, according to the first slice identifier, a first function instance corresponding to the first slice identifier.

504. The controller separately sends, to the first UE and the first function instance according to the first slice identifier, instruction information for setting up a bearer.

The bearer is used to transmit a data packet of a first service corresponding to the first UE, the bearer corresponds to the first slice identifier, and the instruction information carries an identity of the first UE and an identity of the first function instance.

An implementation of step 501 is similar to that of step 301 in the foregoing embodiment. An implementation of step 503 is similar to that of step 201 in the foregoing embodiment. An implementation of step 504 is similar to that of step 202 in the foregoing embodiment. Details are not exhaustively described herein. The following describes step 502 and step 503 in detail.

In an application scenario of supporting authentication and slice authentication for the user equipment in this embodiment of the present disclosure, the controller first needs to perform identity authentication and slice authentication for the first UE before allocating the function instance to the first UE. Step 503 can be triggered for execution only when the identity authentication and slice authentication of the first UE are successful. If the identity authentication and slice authentication of the first UE are not successful, the controller does not need to allocate the function instance to the first UE, to avoid use of a processing resource and/or a transmission resource by illegal user equipment In the application scenario of step 502 and step 503, the first UE sends a service request message to the PCEF entity, where the service request message includes the first slice identifier. The PCEF entity selects the PCRF entity according to the service request message, and the PCRF entity performs identity authentication and slice authentication for the first UE. After the PCRF entity successfully performs identity authentication and slice authentication for the first UE, the PCRF entity sends the authentication result to the PCEF entity. If the authentication result is that the identity authentication and slice authentication of the first UE are successful, the PCEF entity sends the instance request message to the controller. The instance request message includes the first slice identifier obtained by the PCEF entity from the authentication result. If the controller receives the instance request message sent by the PCEF entity after the PCEF entity receives the authentication result about successful identity authentication and slice authentication of the first UE, the controller triggers step 503 for execution. If the identity authentication and slice authentication of the first UE are not successful, the PCEF entity does not send the instance request message to the controller.

It should be noted that, in the foregoing embodiment of the present disclosure, after step 501 in which the controller obtains the correspondence between the service and the network slice, the communication control method provided by this embodiment of the present disclosure may further include the following step.

E1. The controller sends the correspondence between the service and the network slice to the PCRF entity.

The PCRF entity may be configured to perform slice authentication for the UE according to the correspondence between the service and the network slice.

In an application scenario of supporting authentication and slice authentication for the user equipment in this embodiment of the present disclosure, after step 501 is performed, the foregoing step E1 further needs to be triggered for execution. The PCRF entity obtains the correspondence between the service and the network slice by using the controller, and the PCRF performs slice authentication for the UE according to the foregoing obtained correspondence. For example, the controller sends the correspondence between the service and the network slice to the PCEF entity, and the PCEF entity sends the correspondence to the PCRF entity. When the user equipment initiates different services, the PCRF entity may provide identity authentication and slice authentication for the user equipment according to the correspondence between the service and the network slice, to determine whether the identity of the user equipment is legal and whether the user equipment is authorized to use the network slice.

In other application scenarios of supporting authentication and slice authentication for the user equipment in the present disclosure, the correspondence between the service and the network slice that is obtained by the PCRF entity may also not be sent by the controller. For example, a network slice deployment apparatus sends the correspondence between the service and the network slice to the PCRF entity, and the PCRF entity obtains the correspondence between the service and the network slice by using the network slice deployment apparatus. For another example, after setting up the correspondence between the service and the network slice, a network slice deployment apparatus stores the correspondence to an independent database; and the PCRF entity may further obtain the correspondence between the service and the network slice by actively accessing the database.

Figure 6:
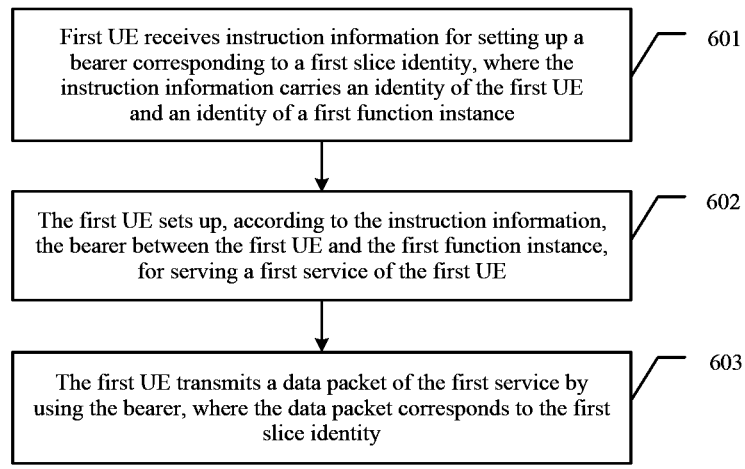
FIG. 6 is a schematic block flowchart of another communication control method according to an embodiment of the present disclosure.

In the foregoing embodiments, the communication control methods provided by the embodiments of the present disclosure are described from the controller side. The following describes, from a user equipment side, a communication control method provided by an embodiment of the present disclosure. Referring to FIG. 6, a communication control method provided by an embodiment of the present disclosure may include the following steps.

601. A first UE receives instruction information for setting up a bearer corresponding to a first slice identifier, where the instruction information carries an identity of the first UE and an identity of a first function instance.

In this embodiment of the present disclosure, a controller determines that the first function instance provides a data packet processing function for the first UE by using a processing resource and/or a transmission resource. The controller separately sends, to the first UE and the first function instance, the instruction information for setting up the bearer. The instruction information for setting up the bearer that is sent by the controller to the first UE and the first function instance may be instruction information for setting up the bearer that is sent by the controller to the first UE and the first function instance through a PCEF entity. After the first UE receives the instruction information of the controller, the first UE and the first function instance respectively perform a bearer setup process. The bearer is a bearer for serving a first service of the first UE. For a specific bearer setup manner, refer to the prior art. Details are not described herein.

602. The first UE sets up, according to the instruction information, the bearer between the first UE and the first function instance, for serving a first service of the first UE.

The bearer corresponds to a first network slice, a slice identifier of the first network slice is the first slice identifier, and the first slice identifier corresponds to the instance identity of the first function instance.

603. The first UE transmits a data packet of the first service by using the bearer, where the data packet corresponds to the first slice identifier.

In this embodiment of the present disclosure, after the first UE sets up the bearer according to the instruction information sent by the controller for setting up the bearer, the bearer may be used to transmit the data packet of the first service corresponding to the first UE. The data packet of the first service corresponding to the first UE corresponds to the first network slice. According to a correspondence between the bearer and the first network slice, the bearer for transmitting the data packet may be determined for the data packet.

It should be noted that, in this embodiment of the present disclosure, the bearer that is set up between the first UE and the first function instance may be used to transmit the data packet of the first service corresponding to the first UE. In an uplink transmission process and a downlink transmission process, data packet processing by the first UE varies. Likewise, in an uplink transmission process and a downlink transmission process, data packet processing by the first function instance also varies. In some embodiments of the present disclosure, step 603 in which the first UE transmits, by using the bearer, the data packet of the first service corresponding to the first UE may include the following steps.

E1. The first UE sends an uplink data packet to the first function instance by using the bearer, so that the first function instance processes the uplink data packet by using a processing resource and/or a transmission resource corresponding to the first slice identifier; and/or E2. The first UE receives, by using the bearer, a downlink data packet that is sent by the first function instance after the first function instance processes the downlink data packet by using a processing resource and/or a transmission resource corresponding to the first slice identifier.

In the uplink transmission process, the first UE sends the uplink data packet to the first function instance by using the bearer between the first UE and the first function instance, and the first function instance processes the uplink data packet by using the processing resource and/or the transmission resource corresponding to the first slice identifier. When specific implementations of the first function instance are different, uplink data packet processing by the first function instance also varies. For example, the function instance may be a base station. In this case, the first function instance includes a first base station. The first base station is determined by the controller and configured to provide a service for the first UE. The first base station corresponds to the first network slice. The first base station may process the uplink data packet according to a processing function provided by the first network slice, and transmit the uplink data packet according to a specified transmission function. In the downlink transmission process, the first function instance processes the downlink data packet by using the processing resource and/or the transmission resource corresponding to the first slice identifier. When specific implementations of the first function instance are different, downlink data packet processing by the first function instance also varies. The first function instance sends the downlink data packet to the first UE after processing the downlink data packet by using the processing resource and/or the transmission resource corresponding to the first slice identifier, and the first UE receives, by using the bearer between the first UE and the first function instance, the downlink data packet sent by the first function instance.

In some embodiments of the present disclosure, the data packet of the first service corresponds to the first slice identifier. Specifically, one or more of the following multiple implementation scenarios may be included:

when the first function instance includes a first GW, an Internet Protocol (IP) quintuple in the downlink data packet received by the first GW corresponds to the first slice identifier; or when the first function instance includes a first data plane function node, at least one of an IP quintuple, a virtual local area network identity (VLAN ID), a multi-protocol label switch (MPLS) label, or a bearer identity in the uplink data packet or the downlink data packet transmitted by the first data plane function node corresponds to the first slice identifier; or when the first function instance includes the first base station, at least one of a physical time-frequency resource, a user identity, or a connection identity used for the uplink data packet received by the first base station corresponds to the first slice identifier.

In this embodiment of the present disclosure, the function instance may have multiple implementations. In different implementations, multiple correspondences may exist between the data packet of the first service corresponding to the first UE and the first slice identifier. For example, the IP quintuple in the downlink data packet sent by the first GW corresponds to the first slice identifier. In this case, by using the correspondence between the IP quintuple and the first slice identifier, it may be learned that the slice identifier that needs to be used for the downlink data packet sent by the first GW is the first slice identifier. The IP quintuple, the VLAN ID, the MPLS label, or the bearer identity in the uplink data packet or the downlink data packet transmitted by the first data plane function node corresponds to the first slice identifier. In different implementation scenarios, the first data plane function node needs to use the IP quintuple, the VLAN ID, the MPLS label, or the bearer identity in the uplink data packet or the downlink data packet. In this case, by using the foregoing correspondence, it may be learned that the slice identifier that needs to be used for the IP quintuple, the VLAN ID, the MPLS label, or the bearer identity in the uplink data packet or the downlink data packet is the first slice identifier. The physical time-frequency resource, the user identity, or the connection identity used for the uplink data packet received by the first base station corresponds to the first slice identifier. In different implementation scenarios, the first base station requires the physical time-frequency resource, the user identity, or the connection identity used for the uplink data packet. In this case, by using the foregoing correspondence, it may be learned that the physical time-frequency resource, the user identity, or the connection identity used for the uplink data packet is the first slice identifier.

As can be known from the description of the present disclosure in the foregoing embodiment, according to the instruction information sent by the controller to the first UE and the first function instance separately for setting up the bearer, the first UE sets up the bearer for serving the first service of the first UE. The first UE transmits, by using the bearer, the data packet of the first service corresponding to the first UE, and the data packet of the first service corresponding to the first UE corresponds to the first slice identifier. In this embodiment of the present disclosure, the controller obtains the correspondence between the service and the network slice according to the first slice identifier. The slice identifier of the network slice corresponds to the instance identity of the function instance. When the UE has different service identities, different slice identities may be obtained. For example, the first UE requests the controller to allocate a function instance, and a slice identifier corresponding to the first UE is the first slice identifier, or a slice identifier corresponding to the first service initiated by the first UE is the first slice identifier. The controller may obtain the corresponding first function instance according to the first slice identifier, and the first function instance configured by the controller may include one or more function instances. Different function instances can provide different processing functions by using different processing resources and/or transmission resources. In this embodiment of the present disclosure, a corresponding function instance is selected according to a slice identifier. Therefore, different function instances can provide differentiated processing functions by using different processing resources and/or transmission resources according to service requirements. Therefore, specific service functions, specific quality of service requirements, and specific quality of experience requirements can be met. Therefore, differentiated services can be provided for different user equipments and different services.

Figure 7:
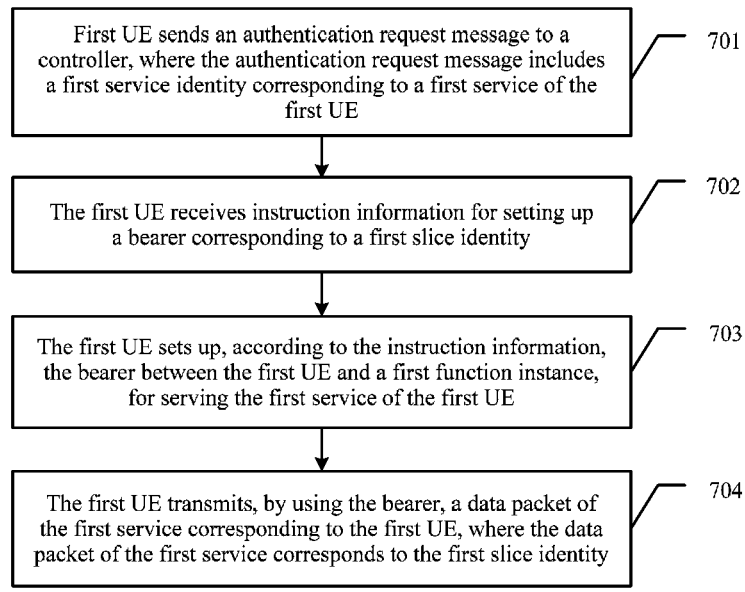
FIG. 7 is a schematic block flowchart of another communication control method according to an embodiment of the present disclosure.

The following describes, from a user equipment side, another communication control method provided by an embodiment of the present disclosure. Referring to FIG. 7, a communication control method provided by an embodiment of the present disclosure may include the following steps.

701. A first UE sends an authentication request message to a controller, where the authentication request message includes a first service identity corresponding to a first service of the first UE.

702. The first UE receives instruction information for setting up a bearer corresponding to a first slice identifier.

703. The first UE sets up, according to the instruction information, the bearer between the first UE and a first function instance, for serving the first service of the first UE.

704. The first UE transmits, by using the bearer, a data packet of the first service corresponding to the first UE, where the data packet of the first service corresponds to the first slice identifier.

Implementations of steps 702 to 704 are similar to those of steps 601 to 603. The following describes step 701 in detail.

In an application scenario of supporting authentication and slice authentication for the user equipment in this embodiment of the present disclosure, the controller first needs to perform identity authentication and slice authentication for the first UE before allocating the function instance to the first UE. The controller can determine, according to the first slice identifier corresponding to the first service and obtained by the controller, the first function instance corresponding to the first slice identifier only when the identity authentication and slice authentication of the first UE are successful. If the identity authentication and slice authentication of the first UE are not successful, the controller does not need to allocate the function instance to the first UE, to avoid use of a processing resource and/or a transmission resource by illegal user equipment The controller selects an HSS according to the authentication request message of the first UE, and the HSS performs identity authentication and slice authentication for the first UE. The first UE may add the first slice identifier to the authentication request message sent by the first UE, so that the HSS performs identity authentication and slice authentication for the first UE. Alternatively, the first UE may not add the first slice identifier to the authentication request message sent by the first UE. After the HSS successfully performs identity authentication and slice authentication for the first UE, an authentication result sent by the HSS to the controller carries the first slice identifier corresponding to the first UE, or the first slice identifier corresponding to the service initiated by the first UE. After successful authentication of the first UE, the first UE performs step 702, and the controller sends the instruction information for the bearer to the first UE.

Figure 8:
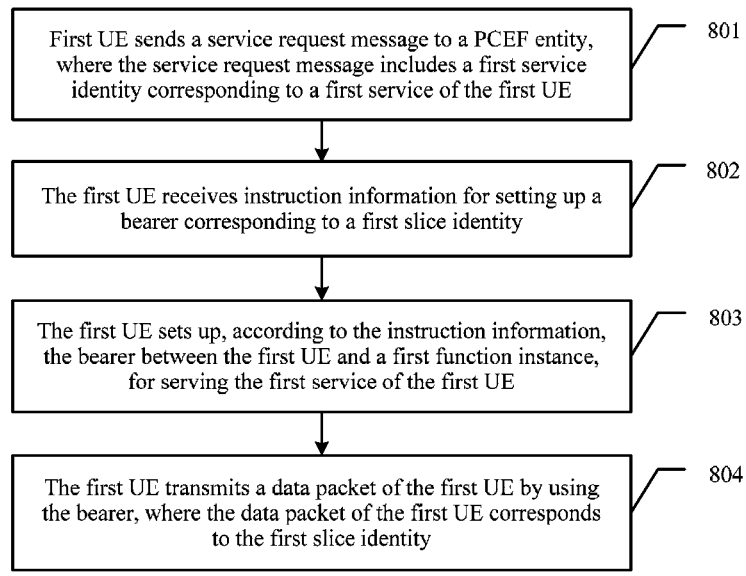
FIG. 8 is a schematic block flowchart of another communication control method according to an embodiment of the present disclosure.

The following describes, from a user equipment side, another communication control method provided by an embodiment of the present disclosure. Referring to FIG. 8, a communication control method provided by an embodiment of the present disclosure may include the following steps.

801. A first UE sends a service request message to a PCEF entity, where the service request message includes a first service identity corresponding to a first service of the first UE.

802. The first UE receives instruction information for setting up a bearer corresponding to a first slice identifier.

803. The first UE sets up, according to the instruction information, the bearer between the first UE and a first function instance, for serving the first service of the first UE.

804. The first UE sends a service request message to the PCEF entity, where the service request message includes the first service identity corresponding to the service initiated by the first UE.

Implementations of steps 802 to 804 are similar to those of steps 601 to 603. The following describes step 801 in detail.

In an application scenario of supporting authentication and slice authentication for the user equipment in this embodiment of the present disclosure, a controller first needs to perform identity authentication and slice authentication for the first UE before allocating the function instance to the first UE. If the identity authentication and slice authentication of the first UE are not successful, the controller does not need to allocate the function instance to the first UE, to avoid use of a processing resource and/or a transmission resource by illegal user equipment The first UE sends the service request message to the PCEF entity, where the service request message includes the first slice identifier. The PCEF entity selects a PCRF entity according to the service request message, and the PCRF entity performs identity authentication and slice authentication for the first UE. After the PCRF entity successfully performs identity authentication and slice authentication for the first UE, the PCRF entity sends an authentication result to the PCEF entity. If the authentication result is that the identity authentication and slice authentication of the first UE are successful, the PCEF entity sends an instance request message to the controller. The instance request message includes the first slice identifier obtained by the PCEF entity from the authentication result. The controller selects the first function instance for the first UE according to the received instance request message sent by the PCEF entity, and sends, to the first UE, the instruction information for setting up the bearer. If the identity authentication and slice authentication of the first UE are not successful, the PCEF entity does not send an instance request message to the controller. The controller does not receive the instance request message sent by the PCEF entity, and the controller does not select the function instance for the first UE.

Figure 9:
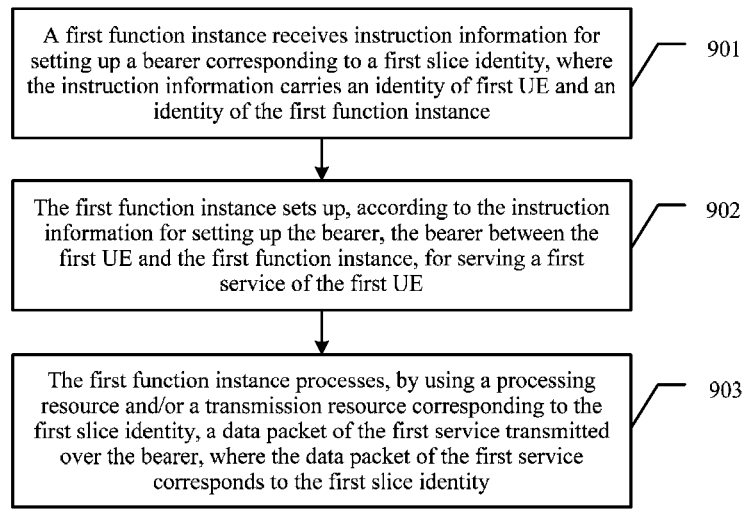
FIG. 9 is a schematic block flowchart of another communication control method according to an embodiment of the present disclosure.

In the foregoing embodiments, the communication control methods provided by the embodiments of the present disclosure are described from the controller side and the user equipment side. The following describes, from a function instance side, a communication control method provided by an embodiment of the present disclosure. Referring to FIG. 9, a communication control method provided by an embodiment of the present disclosure may include the following steps.

901. A first function instance receives instruction information for setting up a bearer corresponding to a first slice identifier, where the instruction information carries an identity of first UE and an identity of the first function instance.

In this embodiment of the present disclosure, a controller determines that the first function instance provides a data packet processing function for the first UE by using a processing resource and/or a transmission resource. The controller separately sends, to the first UE and the first function instance, the instruction information for setting up the bearer. The instruction information for setting up the bearer that is sent by the controller to the first UE and the first function instance may be instruction information for setting up the bearer that is sent by the controller to the first UE and the first function instance through a PCEF entity. After the first function instance receives the instruction information of the controller, the first function instance and the first UE respectively perform a bearer setup process. The bearer is a bearer for serving a first service of the first UE. For a specific bearer setup manner, refer to the prior art. Details are not described herein.

902. The first function instance sets up, according to the instruction information for setting up the bearer, the bearer between the first UE and the first function instance, for serving a first service of the first UE.

903. The first function instance processes, by using a processing resource and/or a transmission resource corresponding to the first slice identifier, a data packet of the first service transmitted over the bearer, where the data packet of the first service corresponds to the first slice identifier.

In this embodiment of the present disclosure, after the controller selects the first function instance for the first UE, the controller determines that the first function instance provides the data packet processing function for the first UE by using the processing resource and/or transmission resource. The controller separately sends, to the first UE and the first function instance, the instruction information for setting up the bearer. The instruction information for setting up the bearer that is sent by the controller to the first UE and the first function instance may be instruction information for setting up the bearer that is sent by the controller to the first UE and the first function instance through the PCEF entity. The instruction information sent by the controller for setting up the bearer includes the first slice identifier, and the first slice identifier corresponds to the first UE or corresponds to the service initiated by the first UE.

In an implementation scenario in which the first slice identifier corresponds to the first user equipment, the slice identifier used by the first user equipment is the first slice identifier, and different user equipments may use different slice identities. For example, the first user equipment corresponds to a slice identifier x, and the second user equipment corresponds to a slice identifier y. In this case, the controller selects, according to the slice identifier x, a function instance 1 and a function instance 2 corresponding to the slice identifier x. The controller selects, according to the slice identifier y, a function instance 3 corresponding to the slice identifier y. That is, the controller may provide differentiated services for multiple user equipments according to different slice identities used by different user equipments. In an implementation scenario in which the first slice identifier corresponds to the service initiated by the first user equipment, when the first user equipment initiates multiple services, different services initiated by the first user equipment correspond to different slice identities, and the controller may allocate different function instances for the different services initiated by the first user equipment. For example, the first user equipment initiates two services (a service a and a service b, respectively), the service a initiated by the first user equipment corresponds to a slice identifier x, and the service b initiated by the first user equipment corresponds to a slice identifier y. In this case, the controller selects, according to the slice identifier x, a function instance 1 and a function instance 2 corresponding to the slice identifier x, and the controller selects, according to the slice identifier y, a function instance 3 corresponding to the slice identifier y. Therefore, in this embodiment of the present disclosure, the controller may configure different function instances for different user equipments, and therefore may provide differentiated services for different user equipments. In addition, in this embodiment of the present disclosure, the controller may further configure different function instances for different services of the same user equipment, and therefore may provide differentiated services for different services of the same user equipment.

It should be noted that, in this embodiment of the present disclosure, different function instances use different processing resources and/or transmission resources. For example, the function instances may be a base station, a GW, and a data plane function node. When the function instances represent different entities, processing resources and/or transmission resources corresponding to the function instances may be different. The first function instance includes at least one of a first GW, a first data plane function node, or a first base station.

In this embodiment of the present disclosure, after the first function instance sets up the bearer according to the instruction information sent by the controller for setting up the bearer, the bearer may be used to transmit the data packet of the first service corresponding to the first UE. The data packet of the first service corresponding to the first UE corresponds to a first network slice. According to a correspondence between the bearer and the first network slice, the bearer for transmitting the data packet may be determined for the data packet. It should be noted that, in this embodiment of the present disclosure, the bearer that is set up between the first UE and the first function instance may be used to transmit the data packet of the first service corresponding to the first UE, and the data packet is transmitted between the first UE and the first function instance. In an uplink transmission process and a downlink transmission process, data packet processing by the first UE varies. Likewise, in an uplink transmission process and a downlink transmission process, data packet processing by the first function instance varies.

In some embodiments of the present disclosure, step 903 in which the first function instance processes, by using the processing resource and/or the transmission resource corresponding to the first slice identifier, the data packet of the first service transmitted over the bearer, may include the following steps.

F1. The first function instance receives, by using the bearer, an uplink data packet sent by the first UE, so that the first function instance processes the uplink data packet by using the processing resource and/or the transmission resource corresponding to the first slice identifier; and/or F2. The first function instance processes a downlink data packet by using the processing resource and/or the transmission resource corresponding to the first slice identifier, and then sends the processed downlink data packet to the first UE by using the bearer.

In the uplink transmission process, the first UE sends the uplink data packet to the first function instance by using the bearer between the first UE and the first function instance, and the first function instance processes the uplink data packet by using the processing resource and/or the transmission resource corresponding to the first slice identifier. When specific implementations of the first function instance are different, uplink data packet processing by the first function instance also varies. For example, the function instance may be a base station. In this case, the first function instance includes the first base station. The first base station is determined by the controller and configured to provide a service for the first UE. The first base station corresponds to the first network slice. The first base station may process the uplink data packet according to a processing function provided by the first network slice, and transmit the uplink data packet according to a specified transmission function.

In the downlink transmission process, the first function instance processes the downlink data packet by using the processing resource and/or the transmission resource corresponding to the first slice identifier. When specific implementations of the first function instance are different, downlink data packet processing by the first function instance also varies. The first function instance sends the downlink data packet to the first UE after processing the downlink data packet by using the processing resource and/or the transmission resource corresponding to the first slice identifier, and the first UE receives, by using the bearer between the first UE and the first function instance, the downlink data packet sent by the first function instance.

In some embodiments of the present disclosure, the data packet of the first service corresponds to the first slice identifier. Specifically, one or more of the following multiple implementation scenarios may be included:

when the first function instance includes the first GW, an IP quintuple in the downlink data packet received by the first GW corresponds to the first slice identifier; or when the first function instance includes the first data plane function node, at least one of an IP quintuple, a VLAN ID, an MPLS label, or a bearer identity in the uplink data packet or the downlink data packet transmitted by the first data plane function node corresponds to the first slice identifier; or when the first function instance includes the first base station, at least one of a physical time-frequency resource, a user identity, or a connection identity used for the uplink data packet received by the first base station corresponds to the first slice identifier.

In this embodiment of the present disclosure, the function instance may have multiple implementations. In different implementations, multiple correspondences may exist between the data packet of the first service corresponding to the first UE and the first slice identifier. For example, the IP quintuple in the downlink data packet sent by the first GW corresponds to the first slice identifier. In this case, by using the correspondence between the IP quintuple and the first slice identifier, it may be learned that the slice identifier that needs to be used for the downlink data packet sent by the first GW is the first slice identifier. At least one of the IP quintuple, the VLAN ID, the MPLS label, or the bearer identity in the uplink data packet or the downlink data packet transmitted by the first data plane function node corresponds to the first slice identifier. In different implementation scenarios, the first data plane function node needs to use the IP quintuple, the VLAN ID, the MPLS label, or the bearer identity in the uplink data packet or the downlink data packet. In this case, by using the foregoing correspondence, it may be learned that the slice identifier that needs to be used for the IP quintuple, the VLAN ID, the MPLS label, or the bearer identity in the uplink data packet or the downlink data packet is the first slice identifier. The physical time-frequency resource, the user identity, or the connection identity used for the uplink data packet received by the first base station corresponds to the first slice identifier. In different implementation scenarios, the first base station requires the physical time-frequency resource, the user identity, or the connection identity used for the uplink data packet. In this case, by using the foregoing correspondence, it may be learned that the physical time-frequency resource, the user identity, or the connection identity used for the uplink data packet is the first slice identifier.

As can be known from the description of the present disclosure in the foregoing embodiment, the first function instance receives the instruction information that is sent by the controller to the first function instance and the first UE separately for setting up the bearer; the first function instance sets up, according to the instruction information for setting up the bearer, the bearer for serving the first service of the first UE, where the bearer corresponds to the first network slice selected by the controller for the data packet of the first service corresponding to the first UE; and the first function instance processes, by using the processing resource and/or transmission resource corresponding to the first slice identifier, the data packet that is of the first service corresponding to the first UE and is transmitted over the bearer, where the data packet of the first service corresponding to the first UE corresponds to the first slice identifier. In this embodiment of the present disclosure, different services have different service identities, and different services have different service requirements. When the UE has different service identities, different slice identities may be obtained. For example, the first UE requests the controller to allocate a function instance, and a slice identifier corresponding to the first UE is the first slice identifier, or a slice identifier corresponding to the first service initiated by the first UE is the first slice identifier. The controller may obtain the corresponding first function instance according to the first slice identifier, and the first function instance configured by the controller may include one or more function instances. Different function instances can provide different processing functions by using different processing resources and/or transmission resources. In this embodiment of the present disclosure, a corresponding function instance is selected according to a slice identifier. Therefore, different function instances can provide differentiated processing functions by using different processing resources and/or transmission resources according to service requirements. Therefore, specific service functions, specific quality of service requirements, and specific quality of experience requirements can be met. Therefore, differentiated services can be provided for different user equipments and different services.

Figure 10:
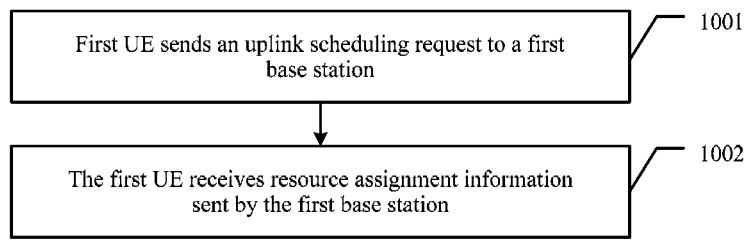
FIG. 10 is a schematic block flowchart of another communication control method according to an embodiment of the present disclosure.

In the foregoing embodiments, the communication control methods provided by the embodiments of the present disclosure are described from the controller side, the UE side, and the function instance side. The following describes, from a UE side, another communication control method provided by an embodiment of the present disclosure. Referring to FIG. 10, a communication control method provided by an embodiment of the present disclosure may include the following steps.

1001. A first UE sends an uplink scheduling request to a first base station.

The uplink scheduling request includes a first slice identifier or a first connection identity corresponding to a data packet that the first UE needs to send.

In this embodiment of the present disclosure, a function instance selected by a controller for the first UE is the first base station, and the first UE needs to request an air interface transmission resource from the first base station. According to the prior art, when UE requests an air interface transmission resource from a base station, the air interface transmission resource allocated by the base station to the UE is intended for the whole UE, but cannot be specific to a service of the UE. However, in this embodiment of the present disclosure, when multiple services of the UE correspond to different network slices, processing resources and transmission resources corresponding to different network slices are different. Therefore, the uplink scheduling request sent by the first UE includes the first slice identifier or the first connection identity corresponding to the data packet that the first UE needs to send, that is, the air interface transmission resource requested by the first UE from the first base station is the first slice identifier or the first connection identity corresponding to the data packet that the UE needs to send. Therefore, when multiple services are configured in the first UE, data packets that the UE needs to send are also different. The different data packets correspond to different slice identities or connection identities. In this case, the base station allocates different air interface transmission resources for different slice identities or connection identities.

It should be noted that, in this embodiment of the present disclosure, the uplink scheduling request includes the first slice identifier or the first connection identity. For example, the uplink scheduling request includes the first slice identifier corresponding to the data packet that the first UE needs to send, or the uplink scheduling request includes the first connection identity corresponding to the data packet that the first UE needs to send. An association relationship exists between the first slice identifier and the first connection identity. In an application scenario in which the first UE requests the first base station to allocate the air interface transmission resource, the first UE may add the first slice identifier or the first connection identity to the uplink scheduling request, and the first base station may determine the first slice identifier according to the first connection identity.

In some embodiments of the present disclosure, before step 1001 in which the first UE sends the uplink scheduling request to the first base station, the communication control method provided by this embodiment of the present disclosure may further include the following step.

G1. According to instruction information sent by a controller to the first UE and the first base station separately for setting up a bearer, the first UE sets up the bearer for serving a first service of the first UE.

In this embodiment of the present disclosure, after the controller selects the first base station for the first UE, the controller determines that the first base station provides a data packet processing function for the first UE by using a processing resource and/or a transmission resource. The controller separately sends, to the first UE and the first base station, the instruction information for setting up the bearer.

The instruction information for setting up the bearer that is sent by the controller to the first UE and the first base station may be instruction information for setting up the bearer that is sent by the controller to the first UE and the first base station through a PCEF entity. After the first UE receives the instruction information of the controller, the first UE and the first base station respectively perform a bearer setup process. The bearer is a bearer for serving the first service of the first UE. For a specific bearer setup manner, refer to the prior art. Details are not described herein.

1002. The first UE receives resource assignment information sent by the first base station.

The resource assignment information includes the first slice identifier or the first connection identity, and the processing resource and/or the transmission resource corresponding to the first slice identifier or the first connection identity, and the processing resource and/or the transmission resource include/includes the air interface transmission resource.

In this embodiment of the present disclosure, after the first base station receives the uplink scheduling request that is sent by the first UE and carries the first slice identifier or the first connection identity, the first base station may allocate the air interface transmission resource for the first slice identifier or the first connection identity, and the first base station sends the resource assignment information to the first UE. The resource assignment information includes the air interface transmission resource that is allocated by the first base station and corresponds to the first slice identifier or the first connection identity. The allocated air interface transmission resource corresponds to the first slice identifier or the first connection identity. Therefore, only the data packet corresponding to the first slice identifier or the first connection identity in the first UE can use the air interface transmission resource allocated by the first base station. When a first function instance is the first base station, the air interface transmission resource allocated by the first base station to the first UE is an implementation of a transmission resource used by the function instance.

In some embodiments of the present disclosure, after step 1002 in which the first UE receives the resource assignment information sent by the first base station, the communication control method provided by this embodiment of the present disclosure may further include the following step.

H1. The first UE transmits, on an air interface transmission resource, a data packet of the first service corresponding to the first UE.

In this embodiment of the present disclosure, after obtaining the air interface transmission resource allocated by the first base station, the first UE transmits, by using the air interface transmission resource, the data packet of the first service corresponding to the first UE, and the data packet of the first service corresponding to the first UE corresponds to a first network slice.

As can be known from the description of the present disclosure in the foregoing embodiment, the first UE sends the uplink scheduling request to the first base station. The uplink scheduling request includes the first slice identifier or the first connection identity corresponding to the data packet that the first UE needs to send. The first UE receives the resource assignment information sent by the first base station, and the air interface transmission resource allocated by the first base station corresponds to the first slice identifier or the first connection identity. Therefore, the first base station may implement differentiated processing functions for air interface transmission resources allocated for different slice identities or connection identities. Therefore, specific service functions, specific quality of service requirements, and specific quality of experience requirements can be met. Therefore, differentiated services can be provided for different user equipments and different services.

Figure 11:
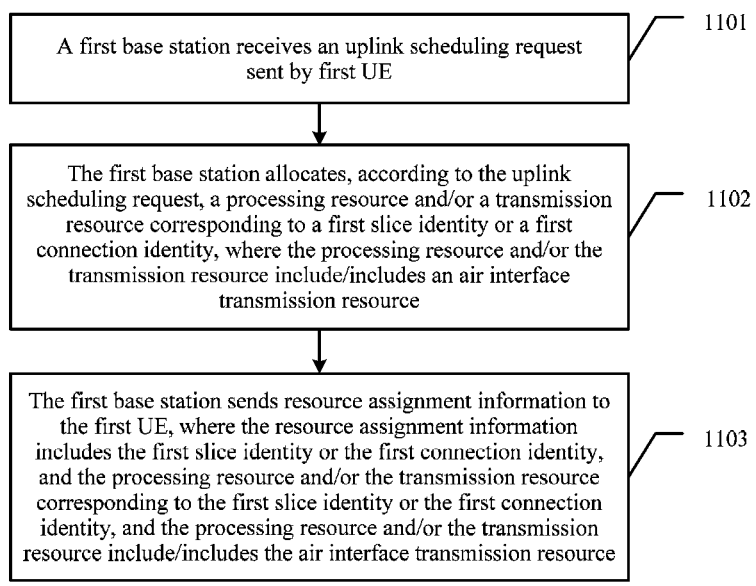
FIG. 11 is a schematic block flowchart of another communication control method according to an embodiment of the present disclosure.

In the foregoing embodiment, another communication control method provided by the embodiment of the present disclosure is described from the user equipment side. The following describes, from a function instance side, another communication control method provided by an embodiment of the present disclosure. The function instance may be a base station. In this case, a function instance selected by a controller according to a first slice identifier is a first base station. Referring to FIG. 11, FIG. 11 shows a communication control method according to an embodiment of the present disclosure. The communication control method shown in FIG. 11 is a method corresponding to the communication control method shown in FIG. 10. The method may include the following steps.

1101. A first base station receives an uplink scheduling request sent by first UE.

The uplink scheduling request includes a first slice identifier or a first connection identity corresponding to a data packet that the UE needs to send.

In this embodiment of the present disclosure, a function instance selected by a controller for the first UE is the first base station, and the first UE needs to request an air interface transmission resource from the first base station. According to the prior art, when UE requests an air interface transmission resource from a base station, the air interface transmission resource allocated by the base station to the UE is intended for the whole UE, but cannot be specific to a service of the UE. However, in this embodiment of the present disclosure, when multiple services of the UE correspond to different network slices, processing resources and transmission resources corresponding to different network slices are different. Therefore, the uplink scheduling request sent by the first UE includes the first slice identifier or the first connection identity corresponding to the data packet that the first UE needs to send. That is, the air interface transmission resource requested by the first UE from the first base station is the first slice identifier or the first connection identity corresponding to the data packet that the UE needs to send. Therefore, when multiple services are configured in the first UE, data packets that the UE needs to send are also different. The different data packets correspond to different slice identities or connection identities.

It should be noted that, in this embodiment of the present disclosure, the uplink scheduling request sent by the first UE includes the first slice identifier or the first connection identity. For example, the uplink scheduling request includes the first slice identifier corresponding to the data packet that the first UE needs to send, or the uplink scheduling request includes the first connection identity corresponding to the data packet that the first UE needs to send. An association relationship exists between the first slice identifier and the first connection identity. In an application scenario in which the first UE requests the first base station to allocate the air interface transmission resource, the first UE may add the first slice identifier or the first connection identity to the uplink scheduling request, and the first base station may determine the first slice identifier according to the first connection identity.

In some embodiments of the present disclosure, before step 1101 in which the first base station receives the uplink scheduling request sent by the first UE, the communication control method provided by this embodiment of the present disclosure may further include the following step.

I1. According to instruction information sent by a controller to the first UE and the first base station separately for setting up a bearer, the first base station sets up the bearer for serving a first service of the first UE. The data packet of the first service corresponding to the first UE needs to carry the first slice identifier or the first connection identity.

In this embodiment of the present disclosure, after the controller selects the first base station for the first UE, the controller determines that the first base station provides a data packet processing function for the first UE by using a processing resource and/or a transmission resource. The controller separately sends, to the first UE and the first base station, the instruction information for setting up the bearer. The instruction information for setting up the bearer that is sent by the controller to the first UE and the first base station may be instruction information for setting up the bearer that is sent by the controller to the first UE and the first base station through a PCEF entity. After the first UE receives the instruction information of the controller, the first UE and the first base station respectively perform a bearer setup process. The bearer is a bearer for serving the first service of the first UE. For a specific bearer setup manner, refer to the prior art. Details are not described herein.

1102. The first base station allocates, according to the uplink scheduling request, a processing resource and/or a transmission resource corresponding to a first slice identifier or a first connection identity, where the processing resource and/or the transmission resource include/includes an air interface transmission resource.

In this embodiment of the present disclosure, the first base station obtains the first slice identifier or the first connection identity from the uplink scheduling request, and then the first base station allocates the air interface transmission resource for the first slice identifier or the first connection identity. The allocated air interface transmission resource can only be used for the data packet corresponding to the first slice identifier or the first connection identity. For example, two network slices, namely, a network slice A and a network slice B, are configured in the first base station. The network slice A and the network slice B respectively correspond to an independent air interface transmission resource. If two different services in the first base station correspond to the network slice A and the network slice B respectively, and the uplink scheduling request sent by the first UE includes a slice identifier of the network slice A, the first base station allocates an air interface transmission resource according to the slice identifier of the network slice A. If the uplink scheduling request sent by the first UE includes a slice identifier of the network slice B, the first base station allocates another air interface transmission resource according to the slice identifier of the network slice B.

1103. The first base station sends resource assignment information to the first UE, where the resource assignment information includes the first slice identifier or the first connection identity, and the processing resource and/or the transmission resource corresponding to the first slice identifier or the first connection identity, and the processing resource and/or the transmission resource include/includes the air interface transmission resource.

In this embodiment of the present disclosure, the first base station may allocate the air interface transmission resource for the first slice identifier or the first connection identity, and the first base station sends the resource assignment information to the first UE. The resource assignment information includes the air interface transmission resource that is allocated by the first base station and corresponds to the first slice identifier or the first connection identity. The allocated air interface transmission resource corresponds to the first slice identifier or the first connection identity. Therefore, only the data packet corresponding to the first slice identifier or the first connection identity in the first UE can use the air interface transmission resource allocated by the first base station.

In some embodiments of the present disclosure, after step 1103 in which the first base station sends the resource assignment information to the first UE, the communication control method provided by this embodiment of the present disclosure may further include the following step.

J1. The first base station transmits, on the air interface transmission resource, a data packet of the first service corresponding to the first UE.

In this embodiment of the present disclosure, after obtaining the air interface transmission resource allocated by the first base station, the first UE transmits, by using the air interface transmission resource, the data packet of the first service corresponding to the first UE, and the first base station may receive, on the air interface transmission resource, the data packet of the first service corresponding to the first UE. The data packet of the first service corresponding to the first UE corresponds to a first network slice.

As can be known from the description of the present disclosure in the foregoing embodiment, the first UE sends the uplink scheduling request to the first base station, where the uplink scheduling request includes the first slice identifier or the first connection identity corresponding to the data packet that the first UE needs to send; and the first UE receives the resource assignment information sent by the first base station, where the air interface transmission resource allocated by the first base station corresponds to the first slice identifier or the first connection identity. Therefore, the first base station may implement differentiated processing functions for air interface transmission resources allocated for different slice identities or connection identities. Therefore, specific service functions, specific quality of service requirements, and specific quality of experience requirements can be met. Therefore, differentiated services can be provided for different user equipments and different services.

For better understanding and implementing the foregoing solutions of the embodiments of the present disclosure, the following uses a corresponding application scenario as an example for detailed description.

Referring to FIG. 12-*a*, FIG. 12-*a* is a schematic general flowchart of a data packet processing procedure according to an embodiment of the present disclosure. The following three parts are included.

S01. When a service provisioning server raises, to a controller deployed by an operator, a requirement for supporting a specific service in a specific area, the controller deploys a processing resource and/or a transmission resource and/or a function instance for the service on a device related to the specified area, and therefore, a network slice is formed. In addition to a difference in allocation of processing resources and transmission resources, different network slices may have different protocol stack processing procedures.

S02. After deployment of the network slice is completed, when a user uses a specific service, and the specific service is the specific service of the service provisioning server in the specified area, the operator needs to identify that the specific service of the user equipment belongs to the network slice that is already deployed, and associate the specific service of the user equipment with the specific network slice.

S03. When the user equipment sends an uplink data packet of the service to a base station, or when a network-side gateway node or a border router receives a downlink data packet of the service of the user, it is identified, according to the association relationship established in the foregoing step, that the data packet belongs to the network slice, and a resource of the network slice is used for processing based on a corresponding customized processing procedure of the network slice.

The following provides a detailed implementation scenario of each part in the subsequent embodiments.

First, a deployment process of a network slice is described. Referring to FIG. 12-*b*, FIG. 12-*b* is a schematic diagram of an implementation of network slice deployment according to an embodiment of the present disclosure. A specific process includes the following steps.

S11. A controller deployed by an operator receives a service request of a service provisioning server. For example, the controller deployed by the operator receives a service message sent by the service provisioning server, where content of the service message includes: for a specific service in a specified geographical area, a specific quality of service or quality of user experience requirement should be met. That is, service information includes coverage information, a service identity, and a corresponding quality of service or quality of user experience requirement. Herein the service identity may correspond to a specific service, for example, a metering service or a motion sensing game, or may correspond to a type of subscriber, for example, a gold subscriber or a silver subscriber. The process may be implemented by a northbound open interface of the controller of the operator.

S12. To meet the requirement of the specific service, the controller deployed by the operator allocates a slice identifier, deploys a related function instance to an infrastructure within a device range corresponding to the foregoing coverage, and associates the function instance with the slice identifier on the device. A type of function instance processes corresponding data of a slice identifier only. A function instance may process data of only one slice identifier, or may process data of multiple slice identities. To meet the specific service requirement of the foregoing service provisioning server, a set of related function instances, transmission resources, and processing resources is referred to as a network slice. Content of a message sent by the controller to the function instance includes: an instruction for setting up the instance, a function instance type, and the slice identifier. The controller stores the function instance corresponding to the network slice.

S13. The controller sends a correspondence between the service and the network slice, and an HSS or a PCRF entity obtains the slice identifier corresponding to the specific service.

S14. The controller sends a service response including the slice identifier to the service provisioning server.

The following describes a service association process in a scenario of a default bearer. In a process of user access, if UE belongs to a specific application, for example, metering MTC, during access and setup of a default bearer, a network identifies a slice feature of the UE, sets up the default bearer on a specified slice, and sets up a correspondence between an uplink or downlink data packet and the slice on a GW and a base station node and an intermediate data plane processing node. Referring to FIG. 12-*c*, FIG. 12-*c* is a schematic diagram of an association process between a service and a network slice according to an embodiment of the present disclosure. A specific process includes the following steps.

S21. A first UE initiates an access authentication request process. The first UE sends an authentication request message carrying a first slice identifier to a controller. The first slice identifier of the first UE may be obtained when a user subscribes to a service provider. The authentication request message may be transferred by a device such as a base station.

S22. The controller receives the authentication request message sent by the first UE, and the controller may select an HSS according to the first slice identifier carried in the authentication request. The HSS performs authentication for the user, and also performs authorization about whether the user is authorized to use a network slice. That the HSS performs authentication and authorization for the first UE includes two parts. One part is confirming an identity of the user equipment, and the other part is determining whether the first UE can use a first network slice corresponding to the first slice identifier.

S23. After successful authentication and authorization, the HSS returns an authentication result to the controller, where the result carries the first slice identifier, indicating that authentication and authorization of the first UE are successful.

S24. The controller selects, according to the received first slice identifier, and a correspondence between a network slice and a function instance that is stored in a slice deployment phase, a first function instance for serving the first UE. In addition, the controller instructs the selected first function instance to perform a process of setting up a bearer with the first UE, where the instruction for setting up the bearer carries the first slice identifier.

S25. After receiving the instruction for setting up the bearer, the first function instance sets up the bearer for serving a first service of the first UE, and sets up a correspondence between the bearer or data over the bearer and the first network slice. The correspondence may include the following cases: a correspondence between an IP quintuple in a downlink data packet of a GW and the slice identifier, a correspondence between at least one of an IP quintuple, a VLAN ID, an MPLS label, or a bearer identity in an uplink data packet or a downlink data packet on a data plane function node and the slice identifier, and a correspondence between at least one of a physical time-frequency resource, a user identity, or a connection identity used for an uplink data packet sent by a base station and the slice identifier.

S26. The first UE sets up the bearer, and sets up a correspondence between the bearer and the slice identifier, where the correspondence may be: a correspondence between the user identity and/or the connection identity and the slice identifier.

In the foregoing steps S21 to S26, the service association process in the scenario of the default bearer is described. The following describes a service association process in a scenario of a dedicated bearer by using an example. Referring to FIG. 12-*d*, FIG. 12-*d* is a schematic diagram of an association process between a service and a network slice according to an embodiment of the present disclosure. A first UE itself does not have a slice feature, but a specific service that may be initiated by the first UE belongs to a network slice. A specific processing procedure is described as follows:

S31. A first UE initiates a service request process, and sends a service request message carrying a first slice identifier to a PCEF entity. The first slice identifier of the first UE may be obtained when a user subscribes to a service provider. The service request message may be transferred by a device such as a base station.

S32. The PCEF entity performs a service authorization process, and may select a PCRF entity according to the first slice identifier carried in the service request message. The PCRF entity performs authorization for a service of the first UE, and also performs authorization about whether the first UE is authorized to use a network slice.

S33. After successful authorization, the PCRF entity returns an authentication result to the PCEF entity, where the result carries the first slice identifier, indicating that authentication and authorization of the first UE are successful.

S34. After the PCEF entity receives the first slice identifier, the PCEF entity interacts with a controller, and sends an instance request message carrying the first slice identifier to the controller. The controller selects, according to the first slice identifier and a correspondence between a network slice and a function instance that is stored in a slice deployment phase, a function instance for serving the first UE, as a first function instance. The controller returns an instance response to the PCEF entity, where the response carries an instance identity of the first function instance.

S35. The PCEF entity instructs the selected first function instance to perform a process of setting up a bearer with the first UE, where the instruction for setting up the bearer carries the first slice identifier, and sets up a correspondence between a downlink data packet and a first network slice.

S36. After receiving the instruction for setting up the bearer, the first function instance sets up the bearer for serving a first service of the first UE, and sets up a correspondence between the bearer or a data packet over the bearer and the first network slice. The correspondence may include the following cases: a correspondence between an IP quintuple in a downlink data packet of a GW and the slice identifier, a correspondence between at least one of an IP quintuple, a VLAN ID, an MPLS label, or a bearer identity in an uplink data packet or a downlink data packet on a data plane function node and the slice identifier, and a correspondence between at least one of a physical time-frequency resource, a user identity, or a connection identity used for an uplink data packet sent by a base station and the slice identifier.

In the foregoing embodiments shown in FIG. 12-*c* and FIG. 12-*d*, the association process between the service and the network slice is described. The following describes processing of a data packet after a bearer between first UE and a first function instance is set up. Referring to FIG. 12-*e*, FIG. 12-*e* is a schematic diagram of a downlink data packet processing procedure according to an embodiment of the present disclosure. Referring to FIG. 12-*f*, FIG. 12-*f* is a schematic diagram of an uplink data packet processing procedure according to an embodiment of the present disclosure.

In a downlink process shown in FIG. 12-*e*, at an entry gateway, a network slice to which a downlink data packet belongs is identified according to data features such as an IP quintuple, a function instance used by the network slice is used to process the data packet, and data transmission is performed by using a transmission resource transmission policy related to the network slice. As shown in FIG. 12-*e*, after the downlink data packet is obtained by a PCEF entity or a gateway, the network slice is identified according to the IP quintuple or a bearer used for the downlink data packet, and the downlink data packet is directed to a specific network slice for processing. The network slice corresponding to the downlink data packet is obtained according to a correspondence between the downlink data packet and the network slice, and different processing needs to be performed by a network slice 1, a network slice 2, and a network slice 3. For example, the network slice 1 implements a video optimization function for the downlink data packet, the network slice 2 implements a segmentation function for the downlink data packet, and the network slice 3 implements another segmentation function for the downlink data packet. After the downlink data packet is processed by the network slice 1, the network slice 2, and the network slice 3 by using different processing resources, the downlink data packet further needs to be processed by the network slice 1, the network slice 2, and the network slice 3 by using different transmission resources. The downlink data packet is processed according to different transmission paths and transmission policies. After the downlink data packet arrives at a base station, the base station performs different processing according to different processing functions corresponding to the network slice 1, the network slice 2, and the network slice 3. For example, the base station transmits the downlink data packet by using a shared transmission resource, or transmits the downlink data packet by using an independent transmission resource.

It should be noted that, in the foregoing network slice deployment phase, a series of function instances is already deployed for the network slice. The series of function instances also varies in different scenarios, for example, in a car to car (C2C) communication scenario, processing functions of a network layer and a data link layer, and relocated processing functions of a core network and an application layer, or for example, in an MTC scenario, processing functions and aggregation processing of a network layer and a data link layer.

A transmission policy used for a transmission resource means that, for a VLAN ID, an MPLS label, or the like allocated to a network slice, a transmission network may provide service guarantee for the network slice according to the label. If the network slice occupies an independent physical resource, the corresponding physical resource is also selected in air interface scheduling to transmit a data packet, and the policy corresponding to the network slice also affects a processing behavior of a function instance. For example, 1 ms scheduling or 0.1 ms scheduling needs to be performed according to a time set in the transmission policy.

In an uplink process shown in FIG. 12-*f*, if a network slice occupies an independent air interface transmission resource, a base station directly identifies, according to the physical resource, a network slice to which a data packet belongs, and performs processing according to previous deployment. If the slice uses a shared air interface transmission resource, the base station needs to process, according to a correspondence that is set up in a service access or service setup process, a data packet by using a processing function corresponding to the slice, and performs transmission according to a specified transmission policy. As shown in FIG. 12-*f*, an uplink data packet is sent by first UE to a base station. After the base station obtains the uplink data packet, the base station identifies a network slice according to a physical resource or according to a bearer, directs the uplink data packet to a specific network slice for processing, and obtains, according to a correspondence between the uplink data packet and the network slice, the network slice corresponding to the uplink data packet. Different processing needs to be performed by a network slice 1, a network slice 2, and a network slice 3. For example, the network slice 1 corresponds to a GW, the network slice 2 corresponds to a multimedia broadcast multicast service (MBMS) coordination entity, and the network slice 3 corresponds to another MBMS coordination entity. After the uplink data packet is processed by the network slice 1, the network slice 2, and the network slice 3 by using different processing resources, the uplink data packet further needs to be processed according to different transmission resources used by the network slice 1, the network slice 2, and the network slice 3, and is processed according to different transmission paths and transmission policies. The uplink data packet arrives at different function entities through different network slices. For example, the network slice 1 corresponds to a video selection entity, the network slice 2 corresponds to an aggregation entity, and the network slice 3 corresponds to another aggregation entity.

Downlink data packet processing and uplink data packet processing in FIG. 12-e and FIG. 12-f are described in the present disclosure. The following describes an air interface transmission resource request that needs to be executed in an embodiment of the present disclosure before processing of a downlink data packet and an uplink data packet. Referring to FIG. 12-g, FIG. 12-g is a schematic diagram of an air interface transmission resource allocation process implemented between first UE and a first base station according to an embodiment of the present disclosure. The following steps are mainly included.

S41. A first UE sends an uplink scheduling request to a first base station. The uplink scheduling request includes a first slice identifier or a first connection identity corresponding to a data packet that the first UE needs to send.

Before sending an uplink data packet, the first UE needs to send the uplink scheduling request to the first base station, to request the first base station to allocate an air interface transmission resource to the first UE. In a current standard design, a resource request of UE is specific to a terminal. That is, in the prior art, an air interface transmission resource allocated by a base station to UE is applicable to all data packets of the UE. However, in this embodiment of the present disclosure, the uplink scheduling request sent by the first UE carries the first slice identifier or the first connection identity, and the air interface transmission resource allocated by the first base station is intended for a specific service flow in the first UE. In a scenario in which multiple services of a user terminal belong to different network slices, physical resources or scheduling policies corresponding to different network slices are different. For example, the first base station includes two network slices A and B, and the two network slices use independent transmission resources. If two services of the first UE respectively correspond to slices A and B, according to the prior art, when the terminal sends an uplink resource request, the base station cannot determine which part of transmission resources are to be allocated to the terminal.

The solution provided by this embodiment of the present disclosure is as follows: When multiple services of user equipment belong to different network slices, if physical resources or scheduling policies corresponding to the different network slices are different, the user equipment needs to add a slice identifier or a data connection identity to an uplink scheduling request, where the connection identity may be a logical channel identifier (LCID). For example, the uplink scheduling request sent by the first UE carries the first slice identifier or the first connection identity, so that the first base station may allocate, in a correct slice, an air interface transmission resource to the uplink request.

S42. The first base station sends an acknowledgement message to the first UE.

After receiving the uplink scheduling request sent by the first UE, the first base station returns the acknowledgement message, and further finds, according to a correspondence between a network slice and the slice identifier or a UE identity plus the connection identity, the air interface transmission resource corresponding to the first slice identifier or the first connection identity.

S43. The first base station sends resource assignment information to the first UE.

The first base station allocates, in the foregoing air interface transmission resource, a transmission resource to the uplink scheduling request of the first UE, and returns the resource assignment information to the first UE. The resource assignment information carries the first slice identifier or the first connection identity, and the air interface transmission resource. The air interface transmission resource corresponds to specific time-frequency resource information.

It should be noted that, when the service of the user equipment belongs to only one network slice, the uplink resource request of the user equipment may not carry the first slice identifier or the first connection identity, but carries only the user identity according to the prior art. Certainly, the uplink resource request of the user equipment may also carry the first slice identifier or the first connection identity. When the base station receives the uplink scheduling request sent by the first UE, the base station searches, according to the correspondence between the user identity and the network slice that is set up in a bearer setup phase, for the air interface transmission resource corresponding to the scheduling request. After finding the corresponding air interface transmission resource, the base station allocates the air interface transmission resource to the first UE, and returns the resource assignment information to the first UE, where the resource assignment information carries the corresponding air interface transmission resource.

As can be known from the descriptions of examples in the present disclosure, data packet processing can be implemented quickly in the embodiments of the present disclosure, and for different user equipments, different function instances can be used to provide different services for the different user equipments. In addition, different function instances may be allocated to different services initiated by same user equipment, and different function instances are used to implement different services of same user equipment. Therefore, it can be ensured that an operator can meet different service requirements of a service provider quickly.

It should be noted that, for ease of description in each of the foregoing method embodiments, the method is described as a series of actions. Persons skilled in the art should understand that the actions in the present disclosure are not limited to the sequence described herein because some steps may occur in another sequence or occur simultaneously according to the present disclosure. In addition, persons skilled in the art should also appreciate that all the embodiments described in the specification are preferred embodiments, and the related actions and modules are not necessarily mandatory to the present disclosure.

For better implementing the foregoing solutions of the embodiments of the present disclosure, the following further provides related apparatuses for implementing the foregoing solutions.

Referring to FIG. 13-a, a controller 1300 provided by an embodiment of the present disclosure may include a function instance determining module 1301 and a sending module 1302, where the function instance determining module 1301 is configured to obtain a first slice identifier corresponding to a first service, and determine, according to the first slice identifier, a first function instance corresponding to the first slice identifier; and the sending module 1302 is configured to separately send, to a first UE and the first function instance according to the first slice identifier, instruction information for setting up a bearer, where the bearer is used to transmit a data packet of the first service corresponding to the first UE, and the instruction information carries an identity of the first UE and an identity of the first function instance.

In some embodiments of the present disclosure, referring to FIG. 13-*b*, the controller 1300 further includes an obtaining module 1303, configured to obtain a correspondence between the service and a network slice before the function instance determining module 1301 determines, according to the obtained first slice identifier corresponding to the first service, the first function instance corresponding to the first slice identifier, where the network slice corresponds to the slice identifier.

In some embodiments of the present disclosure, referring to FIG. 13-*c*, the obtaining module 1303 includes: a first receiving submodule 13031, a function instance deployment submodule 13032, and a correspondence configuration submodule 13033, where the first receiving submodule 13031 is configured to receive service information sent by a service provisioning server, where the service information includes a service identity corresponding to the service and a quality of service requirement required by the service, or the service information includes a service identity corresponding to the service, a quality of service requirement required by the service, and area coverage of the service;

the function instance deployment submodule 13032 is configured to deploy the function instance according to the service information, and set up a correspondence between the function instance deployed for the service and the network slice; and the correspondence configuration submodule 13033 is configured to set up the correspondence between the service and the network slice according to the function instance deployed for the service.

In some embodiments of the present disclosure, the sending module 1302 is further configured to send the correspondence between the service and the network slice to the service provisioning server after the obtaining module obtains the correspondence between the service and the network slice.

In some embodiments of the present disclosure, the obtaining module 1303 is configured to obtain the correspondence between the service and the network slice from a network slice deployment apparatus, and that the network slice deployment apparatus sets up the correspondence between the service and the network slice includes:

the network slice deployment apparatus receives service information sent by a service provisioning server, where the service information includes a service identity corresponding to the service and a quality of service requirement required by the service, or the service information includes a service identity corresponding to the service, a quality of service requirement required by the service, and area coverage of the service;

the network slice deployment apparatus deploys the function instance according to the service information, and sets up a correspondence between the function instance deployed for the service and the network slice; and the network slice deployment apparatus sets up the correspondence between the service and the network slice according to the function instance deployed for the service, and sends the correspondence between the service and the network slice to the controller.

In some embodiments of the present disclosure, referring to FIG. 13-*d*, the function instance determining module 1301 includes a second receiving submodule 13011, an authentication selection submodule 13012, and a function instance determining submodule 13013, where the second receiving submodule 13011 is configured to receive an authentication request message sent by the first UE, where the authentication request message includes a first service identity corresponding to the first service of the first UE;

the authentication selection submodule 13012 is configured to select a home subscriber server HSS according to the authentication request message;

the second receiving submodule 13011 is further configured to receive an authentication result that is sent by the HSS about identity authentication and slice authentication performed by the HSS for the first UE; and the function instance determining submodule 13013 is configured to determine the first function instance according to the first slice identifier if the authentication result is that the identity authentication and slice authentication of the first UE are successful.

In some embodiments of the present disclosure, the function instance determining module 1301 is configured to receive an instance request message that is sent by a policy and charging enforcement function PCEF entity after the PCEF entity receives an authentication result sent by a policy and charging rules function PCRF entity about successful identity authentication and slice authentication of the first UE, where the instance request message includes the first slice identifier obtained by the PCEF from the authentication result; and determine the first function instance according to the first slice identifier after the instance request message is received.

In some embodiments of the present disclosure, the sending module 1302 is further configured to send the correspondence between the service and the network slice to the HSS or the PCRF entity.

It should be noted that, content such as information exchange between the modules/units of the foregoing apparatus and the execution processes thereof is based on the same idea as the method embodiments of the present disclosure, and produces the same technical effects as the method embodiments of the present disclosure. For specific content, refer to the descriptions in the method embodiments of the present disclosure. Details are not described again herein.

As can be known from the description of the present disclosure in the foregoing embodiment, the controller selects, according to the first slice identifier, the first function instance corresponding to the first slice identifier, where the first function instance includes one or more function instances corresponding to the first slice identifier; and finally, the controller separately sends, to the first UE and the first function instance, the instruction information for setting up the bearer, where the bearer is used to transmit the data packet of the first service corresponding to the first UE, and the bearer corresponds to the first network slice having the first slice identifier. In this embodiment of the present disclosure, different services have different service identities, and different services have different service requirements. The controller sets up correspondences between the services and network slices according to the service requirements, where slice identities of the network slices correspond to instance identities of function instances. When the UE has different service identities, different slice identities may be obtained. For example, the first UE requests the controller to allocate a function instance, and a slice identifier corresponding to the first UE is the first slice identifier, or a slice identifier corresponding to the first service initiated by the first UE is the first slice identifier. The controller may obtain the corresponding first function instance according to the first slice identifier, and the first function instance configured by the controller may include one or more function instances. Different function instances can provide different processing functions by using different processing resources and/or transmission resources. In this embodiment of the present disclosure, a corresponding function instance is selected according to a slice identifier. Therefore, different function instances can provide differentiated processing functions by using different processing resources and/or transmission resources according to service requirements. Therefore, specific service functions, specific quality of service requirements, and specific quality of experience requirements can be met. Therefore, differentiated services can be provided for different user equipments and different services.

In the foregoing embodiment, the controller provided by the embodiment of the present disclosure is described. The following describes UE provided by an embodiment of the present disclosure. Referring to FIG. 14-a, an embodiment of the present disclosure provides UE 1400. The UE 1400 may include a receiving module 1401, a bearer setup module 1402, and a data packet transmission module 1403, where the receiving module 1401 is configured to receive instruction information for setting up a bearer corresponding to a first slice identifier, where the instruction information carries an identity of the first UE and an identity of the first function instance;

the bearer setup module 1402 is configured to set up, according to the instruction information, the bearer between the first UE and the first function instance, for serving a first service of the first UE, where the first function instance corresponds to the first slice identifier; and the data packet transmission module 1403 is configured to transmit a data packet of the first service by using the bearer, where the data packet corresponds to the first slice identifier.

In some embodiments of the present disclosure, as shown in FIG. 14-b, the first UE 1400 further includes a sending module 1404, where the sending module 1404 is configured to send an authentication request message to the controller, where the authentication request message includes a first service identity corresponding to the first service of the first UE.

In some embodiments of the present disclosure, the first UE further includes a sending module 1404, where the sending module 1404 is configured to send a service request message to a policy and charging enforcement function PCEF entity, where the service request message includes a first service identity corresponding to the first service of the first UE.

In some embodiments of the present disclosure, the data packet transmission module 1403 is configured to send an uplink data packet to the first function instance by using the bearer, so that the first function instance processes the uplink data packet by using a processing resource and/or a transmission resource corresponding to the first slice identifier; and/or receive, by using the bearer, a downlink data packet that is sent by the first function instance after the first function instance processes the downlink data packet by using a processing resource and/or a transmission resource corresponding to the first slice identifier.

In some embodiments of the present disclosure, as shown in FIG. 14-b, the first UE 1400 further includes a sending module 1404, where the sending module 1404 is configured to send an uplink scheduling request to a first base station, where the uplink scheduling request includes the first slice identifier or a first connection identity corresponding to the data packet that the first UE needs to send; and the receiving module 1401 is further configured to receive resource assignment information sent by the first base station, where the resource assignment information includes the first slice identifier or the first connection identity, and an air interface transmission resource corresponding to the first slice identifier or the first connection identity.

It should be noted that, content such as information exchange between the modules/units of the foregoing apparatus and the execution processes thereof is based on the same idea as the method embodiments of the present disclosure, and produces the same technical effects as the method embodiments of the present disclosure. For specific content, refer to the descriptions in the method embodiments of the present disclosure. Details are not described again herein.

As can be known from the description of the present disclosure in the foregoing embodiment, according to the instruction information sent by the controller to the first UE and the first function instance separately for setting up the bearer, the first UE sets up the bearer for serving the first service of the first UE, and the first UE transmits, by using the bearer, the data packet of the first service corresponding to the first UE, where the data packet of the first service corresponding to the first UE corresponds to a first network slice. In this embodiment of the present disclosure, different services have different service identities, and different services have different service requirements. The controller obtains correspondences between the services and network slices, where slice identities of the network slices correspond to instance identities of function instances. When the UE has different service identities, different slice identities may be obtained. For example, the first UE requests the controller to allocate a function instance, and a slice identifier corresponding to the first UE is the first slice identifier, or a slice identifier corresponding to the first service initiated by the first UE is the first slice identifier. The controller may obtain the corresponding first function instance according to the first slice identifier, and the first function instance configured by the controller may include one or more function instances. Different function instances can provide different processing functions by using different processing resources and/or transmission resources. In this embodiment of the present disclosure, a corresponding function instance is selected according to a slice identifier. Therefore, different function instances can provide differentiated processing functions by using different processing resources and/or transmission resources according to service requirements. Therefore, specific service functions, specific quality of service requirements, and specific quality of experience requirements can be met. Therefore, differentiated services can be provided for different user equipments and different services.

In the foregoing embodiments, the controller and the user equipment provided by the embodiments of the present disclosure are described. The following describes a function instance provided by an embodiment of the present disclosure. Referring to FIG. 15-a, an embodiment of the present disclosure provides a first function instance 1500. The first function instance 1500 may include a receiving module 1501, a bearer setup module 1502, and a data packet processing module 1503, where the receiving module 1501 is configured to receive instruction information for setting up a bearer corresponding to a first slice identifier, where the instruction information carries an identity of a first UE and an identity of the first function instance;

the bearer setup module 1502 is configured to set up, according to the instruction information for setting up the bearer, the bearer between the first UE and the first function instance, for serving a first service of the first UE; and the data packet processing module 1503 is configured to process, by using a processing resource and/or a transmission resource corresponding to the first slice identifier, a data packet that is of the first service corresponding to the first UE and is transmitted over the bearer, where the data packet of the first service corresponding to the first UE corresponds to the first slice identifier.

In some embodiments of the present disclosure, the first function instance 1500 includes at least one of a first gateway GW, or a first data plane function node, or a first base station.

In some embodiments of the present disclosure, referring to FIG. 15-b, when the first function instance is the first base station, the first function instance 1500 further includes a resource allocation module 1504 and a sending module 1505, where the receiving module 1501 is further configured to receive, before the data packet processing module 1503 processes, by using the processing resource and/or the transmission resource corresponding to the first slice identifier, the data packet of the first service transmitted over the bearer, an uplink scheduling request sent by the first UE, where the uplink scheduling request includes the first slice identifier or a first connection identity corresponding to the data packet that the UE needs to send;

the resource allocation module 1504 is configured to allocate, according to the uplink scheduling request, an air interface transmission resource corresponding to the first slice identifier or the first connection identity; and the sending module 1505 is configured to send resource assignment information to the first UE, where the resource assignment information includes the first slice identifier or the first connection identity, and the air interface transmission resource corresponding to the first slice identifier or the first connection identity.

In some embodiments of the present disclosure, the data packet processing module 1503 is configured to receive, by using the bearer, an uplink data packet sent by the first UE, and the first function instance processes the uplink data packet by using the processing resource and/or the transmission resource corresponding to the first slice identifier; and/or process a downlink data packet by using the processing resource and/or the transmission resource corresponding to the first slice identifier, and then send the processed downlink data packet to the first UE by using the bearer.

In some embodiments of the present disclosure, that the data packet of the first service corresponding to the first UE corresponds to the first slice identifier includes:

when the first function instance includes the first gateway GW, an Internet Protocol IP quintuple in the downlink data packet received by the first GW corresponds to the first slice identifier; or when the first function instance includes the first data plane function node, at least one of an IP quintuple, a virtual local area network identity VLAN ID, a multiprotocol label switching MPLS label, or a bearer identity in the uplink data packet or the downlink data packet transmitted by the first data plane function node corresponds to the first slice identifier; or when the first function instance includes the first base station, at least one of a physical time-frequency resource, a user identity, or the connection identity used for the uplink data packet received by the first base station corresponds to the first slice identifier.

It should be noted that, content such as information exchange between the modules/units of the foregoing apparatus and the execution processes thereof is based on the same idea as the method embodiments of the present disclosure, and produces the same technical effects as the method embodiments of the present disclosure. For specific content, refer to the descriptions in the method embodiments of the present disclosure. Details are not described again herein.

As can be known from the description of the present disclosure in the foregoing embodiment, the first function instance receives the instruction information that is sent by a controller to the first function instance and the first UE separately for setting up the bearer; the first function instance sets up, according to the instruction information for setting up the bearer, the bearer for serving the first service of the first UE, where the bearer corresponds to a first network slice selected by the controller for the data packet of the first service corresponding to the first UE; and the first function instance processes, by using the processing resource and/or transmission resource corresponding to the first slice identifier, the data packet that is of the first service corresponding to the first UE and is transmitted over the bearer, where the data packet of the first service corresponding to the first UE corresponds to the first network slice. In this embodiment of the present disclosure, different services have different service identities, and different services have different service requirements. The controller obtains correspondences between the services and network slices, where slice identities of the network slices correspond to instance identities of function instances. When the UE has different service identities, different slice identities may be obtained. For example, the first UE requests the controller to allocate a function instance, and a slice identifier corresponding to the first UE is the first slice identifier, or a slice identifier corresponding to the first service initiated by the first UE is the first slice identifier. The controller may obtain the corresponding first function instance according to the first slice identifier, and the first function instance configured by the controller may include one or more function instances. Different function instances can provide different processing functions by using different processing resources and/or transmission resources. In this embodiment of the present disclosure, a corresponding function instance is selected according to a slice identifier. Therefore, different function instances can provide differentiated processing functions by using different processing resources and/or transmission resources according to service requirements. Therefore, specific service functions, specific quality of service requirements, and specific quality of experience requirements can be met. Therefore, differentiated services can be provided for different user equipments and different services.

It should be noted that, content such as information exchange between the modules/units of the foregoing apparatus and the execution processes thereof is based on the same idea as the method embodiments of the present disclosure, and produces the same technical effects as the method embodiments of the present disclosure. For specific content, refer to the descriptions in the method embodiments of the present disclosure. Details are not described again herein.

An embodiment of the present disclosure further provides a computer storage medium. The computer storage medium stores a program. The program includes all or some steps described in the foregoing method embodiments.

The following describes another controller provided by an embodiment of the present disclosure. Referring to FIG. 16-a, a controller 1600 includes a sending unit 1601 and a processing unit 1602, where the processing unit 1602 is configured to obtain a first slice identifier corresponding to a first service, and determine, according to the first slice identifier, a first function instance corresponding to the first slice identifier; and the sending unit 10601 is configured to separately send, to a first UE and the first function instance, instruction information for setting up a bearer, where the bearer is used to transmit a data packet of the first service corresponding to the first UE, the bearer corresponds to the first slice identifier, and the instruction information carries an identity of the first UE and an identity of the first function instance.

In some embodiments of the present disclosure, the processing unit 1602 is further configured to obtain a correspondence between the service and a network slice, where the network slice corresponds to the slice identifier.

In some embodiments of the present disclosure, as shown in FIG. 16-b, the controller 1600 further includes a first receiving unit 1603, where the first receiving unit 1603 is configured to receive service information sent by a service provisioning server, where the service information includes a service identity corresponding to the service and a quality of service requirement required by the service, or the service information includes a service identity corresponding to the service, a quality of service requirement required by the service, and area coverage of the service; and the processing unit 1602 is further configured to deploy the function instance according to the service information, set up a correspondence between the function instance deployed for the service and the network slice, and set up the correspondence between the service and the network slice according to the function instance deployed for the service.

In some embodiments of the present disclosure, the sending unit 1601 is further configured to send the correspondence between the service and the network slice to the service provisioning server.

In some embodiments of the present disclosure, the processing unit 1602 is further configured to obtain the correspondence between the service and the network slice from a network slice deployment apparatus.

In some embodiments of the present disclosure, as shown in FIG. 16-c, the controller 1600 further includes a second receiving unit 1604, where the second receiving unit 1604 is configured to receive an authentication request message sent by the first UE, where the authentication request message includes a first service identity corresponding to the first service of the first UE;

the processing unit 1602 is configured to select a home subscriber server HSS according to the authentication request message;

the second receiving unit 1604 is further configured to receive an authentication result that is sent by the HSS about identity authentication and slice authentication performed by the HSS for the first UE; and the processing unit 1602 is configured to determine the first function instance according to the first slice identifier if the authentication result is that the identity authentication and slice authentication of the first UE are successful.

In some embodiments of the present disclosure, as shown in FIG. 16-d, the controller 1600 further includes a third receiving unit 1605, where the third receiving unit 1605 is configured to receive an instance request message that is sent by a policy and charging enforcement function PCEF entity after the PCEF entity receives an authentication result sent by a policy and charging rules function PCRF entity about successful identity authentication and slice authentication of the first UE, where the instance request message includes the first slice identifier obtained by the PCEF entity from the authentication result; and the processing unit 1602 is configured to determine the first function instance according to the first slice identifier after the instance request message is received.

In some embodiments of the present disclosure, the sending unit 1601 is further configured to send the correspondence between the service and the network slice to the HSS or the PCRF entity.

It should be noted that, in this embodiment of the present disclosure, the processing unit 1602 may be a processor, the sending unit 1601 may be a transmitter, and the receiving unit 1603 may be a receiver. In addition, a quantity of processing units 1602 in the controller 1600 may be one or more. In FIG. 16-a, FIG. 16-b, FIG. 16-c, and FIG. 16-d, one processing unit is used as an example. In some embodiments of the present disclosure, the sending unit 1601, the receiving unit 1603, and the processing unit 1602 may be connected by a bus or in another manner. The first receiving unit, the second receiving unit, and the third receiving unit in the foregoing embodiments may be implemented by using one receiving unit, or may be implemented by using two receiving units or three receiving units. The receiving unit may be a receiver.

As can be known from the description of the present disclosure in the foregoing embodiment, first, the controller sets up the correspondence between the service and the network slice according to a service requirement, and then the controller selects, according to the first slice identifier, the first function instance corresponding to the first slice identifier. The first function instance includes one or more function instances corresponding to the first slice identifier. Finally the controller separately sends, to the first UE and the first function instance, the instruction information for setting up the bearer, where the bearer is used to transmit the data packet of the first service corresponding to the first UE, and the bearer corresponds to a first network slice having the first slice identifier. In this embodiment of the present disclosure, different services have different service identities, and different services have different service requirements. The controller obtains correspondences between the services and network slices, where slice identities of the network slices correspond to instance identities of function instances. When the UE has different service identities, different slice identities may be obtained. For example, the first UE requests the controller to allocate a function instance, and a slice identifier corresponding to the first UE is the first slice identifier, or a slice identifier corresponding to the first service initiated by the first UE is the first slice identifier. The controller may obtain the corresponding first function instance according to the first slice identifier, and the first function instance configured by the controller may include one or more function instances. Different function instances can provide different processing functions by using different processing resources and/or transmission resources. In this embodiment of the present disclosure, a corresponding function instance is selected according to a slice identifier. Therefore, different function instances can provide differentiated processing functions by using different processing resources and/or transmission resources according to service requirements. Therefore, specific service functions, specific quality of service requirements, and specific quality of experience requirements can be met. Therefore, differentiated services can be provided for different user equipments and different services.

The following describes another first UE provided by an embodiment of the present disclosure. Referring to FIG. 17-a, first UE 1700 includes a receiving unit 1701 and a processing unit 1702, where the receiving unit 1701 is configured to receive instruction information for setting up a bearer corresponding to a first slice identifier, where the instruction information carries an identity of the first UE and an identity of the first function instance; and the processing unit 1702 is configured to set up, according to the instruction information, the bearer between the first UE and the first function instance, for serving a first service of the first UE, where the first function instance corresponds to the first slice identifier; and transmit a data packet of the first service by using the bearer, where the data packet corresponds to the first slice identifier.

In some embodiments of the present disclosure, as shown in FIG. 17-b, the first UE 1700 further includes a first sending unit 1703, where the first sending unit 1703 is configured to send an authentication request message to the controller, where the authentication request message includes a first service identity corresponding to the first service of the first UE.

In some embodiments of the present disclosure, as shown in FIG. 17-c, the first UE 1700 further includes a second sending unit 1704, where the second sending unit 1704 is configured to send a service request message to a policy and charging enforcement function PCEF entity, where the service request message includes a first service identity corresponding to the first service of the first UE.

In some embodiments of the present disclosure, as shown in FIG. 17-d, the first UE 1700 further includes a third sending unit 1705, where the third sending unit 1705 is configured to send an uplink data packet to the first function instance by using the bearer, so that the first function instance processes the uplink data packet by using a processing resource and/or a transmission resource corresponding to the first slice identifier; and/or the receiving unit 1701 is further configured to receive, by using the bearer, a downlink data packet that is sent by the first function instance after the first function instance processes the downlink data packet by using a processing resource and/or a transmission resource corresponding to the first slice identifier.

In some embodiments of the present disclosure, as shown in FIG. 17-e, the first UE 1700 further includes a fourth sending unit 1706, where the fourth sending unit 1706 is configured to send an uplink scheduling request to a first base station before the processing unit transmits the data packet of the first service by using the bearer, where the uplink scheduling request includes the first slice identifier or a first connection identity corresponding to the data packet that the first UE needs to send; and the receiving unit 1701 is configured to receive resource assignment information sent by the first base station, where the resource assignment information includes the first slice identifier or the first connection identity, and the processing resource and/or the transmission resource corresponding to the first slice identifier or the first connection identity, and the processing resource and/or the transmission resource include/includes an air interface transmission resource.

It should be noted that, in this embodiment of the present disclosure, the processing unit 1702 may be a processor, the receiving unit 1701 may be a receiver, and the sending unit 1703 may be a transmitter. In addition, a quantity of processing units 1702 in the controller 1700 may be one or more. In FIG. 17-a, FIG. 17-b, FIG. 17-c, FIG. 17-d, and FIG. 17-e, one processing unit is used as an example. In some embodiments of the present disclosure, the sending unit 1703, the receiving unit 1701, and the processing unit 1702 may be connected by a bus or in another manner. The first sending unit, the second sending unit, the third sending unit, and the fourth sending unit in the foregoing embodiments may be implemented by one sending unit, or certainly may be implemented by two sending units, three sending units, or four sending units.

As can be known from the description of the present disclosure in the foregoing embodiment, according to the instruction information sent by the controller to the first UE and the first function instance separately for setting up the bearer, the first UE sets up the bearer for serving the first service of the first UE, and the first UE transmits, by using the bearer, the data packet of the first service corresponding to the first UE, where the data packet of the first service corresponding to the first UE corresponds to a first network slice. In this embodiment of the present disclosure, different services have different service identities, and different services have different service requirements. The controller obtains correspondences between the services and network slices, where slice identities of the network slices correspond to instance identities of function instances. When the UE has different service identities, different slice identities may be obtained. For example, the first UE requests the controller to allocate a function instance, and a slice identifier corresponding to the first UE is the first slice identifier, or a slice identifier corresponding to the first service initiated by the first UE is the first slice identifier. The controller may obtain the corresponding first function instance according to the first slice identifier, and the first function instance configured by the controller may include one or more function instances. Different function instances can provide different processing functions by using different processing resources and/or transmission resources. In this embodiment of the present disclosure, a corresponding function instance is selected according to a slice identifier. Therefore, different function instances can provide differentiated processing functions by using different processing resources and/or transmission resources according to service requirements. Therefore, specific service functions, specific quality of service requirements, and specific quality of experience requirements can be met. Therefore, differentiated services can be provided for different user equipments and different services.

The following describes another first function instance provided by an embodiment of the present disclosure. Referring to FIG. 18-a, the first function instance 1800 includes a receiving unit 1801 and a processing unit 1802, where the receiving unit 1801 is configured to receive instruction information for setting up a bearer corresponding to a first slice identifier, where the instruction information carries an identity of a first UE and an identity of the first function instance; and the processing unit 1802 is configured to set up, according to the instruction information, the bearer between the first UE and the first function instance, for serving a first service of the first UE, and process, by using a processing resource and/or a transmission resource corresponding to the first slice identifier, a data packet of the first service transmitted over the bearer, where the data packet of the first service corresponds to the first slice identifier.

In some embodiments of the present disclosure, the first function instance 1800 includes at least one of a first gateway GW, or a first data plane function node, or a first base station.

In some embodiments of the present disclosure, referring to FIG. 18-b, if the first function instance is the first base station, the first base station further includes a first sending unit 1803, where the receiving unit 1801 is further configured to receive, before the processing unit 1802 processes, by using the processing resource and/or the transmission resource corresponding to the first slice identifier, the data packet of the first service transmitted over the bearer, an uplink scheduling request sent by the first UE, where the uplink scheduling request includes the first slice identifier or a first connection identity corresponding to the data packet that the first UE needs to send;

the processing unit 1802 is further configured to allocate, according to the uplink scheduling request, the processing resource and/or the transmission resource corresponding to the first slice identifier or the first connection identity, where the processing resource and/or the transmission resource include/includes an air interface transmission resource; and the first sending unit 1803 is configured to send resource assignment information to the first UE, where the resource assignment information includes the first slice identifier or the first connection identity, and the processing resource and/or the transmission resource corresponding to the first slice identifier or the first connection identity, and the processing resource and/or the transmission resource include/includes the air interface transmission resource.

In some embodiments of the present disclosure, as shown in FIG. 18-c, the first function instance 1800 further includes a second sending unit 1804, where the receiving unit 1801 is configured to receive, by using the bearer, an uplink data packet sent by the first UE; and the processing unit 1802 is configured to process the uplink data packet by using the processing resource and/or the transmission resource corresponding to the first slice identifier; and/or the processing unit 1802 is configured to process a downlink data packet by using the processing resource and/or the transmission resource corresponding to the first slice identifier; and the second sending unit 1804 is configured to send the processed downlink data packet to the first UE by using the bearer.

In some embodiments of the present disclosure, that the data packet of the first service corresponds to the first slice identifier includes:

when the first function instance includes the first gateway GW, an Internet Protocol IP quintuple in the downlink data packet received by the first GW corresponds to the first slice identifier; or when the first function instance includes the first data plane function node, at least one of an IP quintuple, a virtual local area network identity VLAN ID, a multiprotocol label switching MPLS label, or a bearer identity in the uplink data packet or the downlink data packet transmitted by the first data plane function node corresponds to the first slice identifier; or when the first function instance includes the first base station, at least one of a physical time-frequency resource, a user identity, or the connection identity used for the uplink data packet received by the first base station corresponds to the first slice identifier.

It should be noted that, in this embodiment of the present disclosure, the processing unit 1802 may be a processor, the sending unit 1803 may be a transmitter, and the receiving unit 1801 may be a receiver. In addition, a quantity of processing units 1802 in the controller 1800 may be one or more. In FIG. 18-a, FIG. 18-b, and FIG. 18-c, one processing unit is used as an example. In some embodiments of the present disclosure, the sending unit 1803, the receiving unit 1801, and the processing unit 1802 may be connected by a bus or in another manner. The first sending unit and the second sending unit in the foregoing embodiments may be implemented by one sending unit, or certainly may be implemented by two sending units.

As can be known from the description of the present disclosure in the foregoing embodiment, the first function instance receives the instruction information that is sent by a controller to the first function instance and the first UE separately for setting up the bearer; the first function instance sets up, according to the instruction information for setting up the bearer, the bearer for serving the first service of the first UE, where the bearer corresponds to a first network slice selected by the controller for the data packet of the first service corresponding to the first UE; and the first function instance processes, by using the processing resource and/or transmission resource corresponding to the first slice identifier, the data packet that is of the first service corresponding to the first UE and is transmitted over the bearer, where the data packet of the first service corresponding to the first UE corresponds to the first network slice. In this embodiment of the present disclosure, different services have different service identities, and different services have different service requirements. The controller obtains correspondences between the services and network slices, where slice identities of the network slices correspond to instance identities of function instances. When the UE has different service identities, different slice identities may be obtained. For example, the first UE requests the controller to allocate a function instance, and a slice identifier corresponding to the first UE is the first slice identifier, or a slice identifier corresponding to the first service initiated by the first UE is the first slice identifier. The controller may obtain the corresponding first function instance according to the first slice identifier, and the first function instance configured by the controller may include one or more function instances. Different function instances can provide different processing functions by using different processing resources and/or transmission resources. In this embodiment of the present disclosure, a corresponding function instance is selected according to a slice identifier. Therefore, different function instances can provide differentiated processing functions by using different processing resources and/or transmission resources according to service requirements. Therefore, specific service functions, specific quality of service requirements, and specific quality of experience requirements can be met. Therefore, differentiated services can be provided for different user equipments and different services.

In addition, it should be noted that the described apparatus embodiment is merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. In addition, in the accompanying drawings of the apparatus embodiments provided by the present disclosure, connection relationships between modules indicate that the modules have communication connections with each other, which may be implemented as one or more communications buses or signal cables. Persons of ordinary skill in the art may understand and implement the embodiments of the present disclosure without creative efforts.

Based on the description of the foregoing implementations, persons skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation in most cases. Based on such an understanding, the technical solutions of the present disclosure essentially or the part contributing to the prior art may be implemented in a form of a software product. The software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of the present disclosure.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A communication control method, comprising:
   obtaining, by a controller, a first slice identifier corresponding to a service;
   determining, by the controller, a first function instance corresponding to the first slice identifier;
   separately sending, by the controller, to a first user equipment (UE) and to the first function instance, instruction information for setting up a bearer, wherein the bearer is used to transmit a data packet of the service corresponding to the first UE, the bearer corresponds to the first slice identifier, and the instruction information carries an identity of the first UE and an identity of the first function instance; and
   obtaining, by the controller, a correspondence between the service and a network slice, wherein the network slice corresponds to the first slice identifier, wherein the obtaining, by the controller, the correspondence between the service and the network slice comprises:
   receiving, by the controller, service information from a service provisioning server, wherein the service information comprises a service identity corresponding to the service and a quality of service requirement of the service;
   deploying, by the controller, the first function instance according to the service information, and setting up a correspondence between the first function instance deployed for the service and the network slice; and
   setting up, by the controller, the correspondence between the service and the network slice according to the first function instance deployed for the service.

2. The method according to claim 1, wherein the service information further comprises area coverage of the service.

3. The method according to claim 1, further comprising:
   sending, by the controller, the correspondence between the service and the network slice to a home subscriber server (HSS) or a policy and charging rules function (PCRF) entity.

4. The method according to claim 1, further comprising:
   sending, by the controller, the correspondence between the service and the network slice to the service provisioning server.

5. The method according to claim 1, wherein the obtaining, by the controller, the correspondence between the service and the network slice comprises:
   obtaining, by the controller, the correspondence between the service and the network slice from a network slice deployment apparatus.

6. The method according to claim 1, wherein the determining the first function instance corresponding to the first slice identifier comprises:
   receiving, by the controller, an authentication request message from the first UE, wherein the authentication request message comprises a first service identity corresponding to the service of the first UE;
   selecting, by the controller, a home subscriber server (HSS) according to the authentication request message;
   receiving, by the controller, an authentication result that is from the HSS associated with identity authentication and slice authentication performed by the HSS for the first UE; and
   in response to determining that the authentication result is that the identity authentication and slice authentication of the first UE are successful, determining, by the controller, the first function instance according to the first slice identifier.

7. The method according to claim 1, wherein the obtaining the first slice identifier corresponding to the service comprises:
   receiving, by the controller, an instance request message that is from a policy and charging enforcement function (PCEF) entity after the PCEF entity receives an authentication result from a policy and charging rules function (PCRF) entity about successful identity authentication and slice authentication of the first UE, wherein the instance request message comprises the first slice identifier obtained by the PCEF entity from the authentication result;
   wherein the determining the first function instance corresponding to the first slice identifier comprises:
   determining, by the controller, the first function instance according to the first slice identifier after the controller receives the instance request message.

8. A communication control method, comprising:
receiving, by a first user equipment (UE), instruction information for setting up a bearer corresponding to a first slice identifier, wherein the instruction information carries an identity of the first UE and an identity of a first function instance;
setting up, by the first UE according to the instruction information, the bearer between the first UE and the first function instance, for serving a first service of the first UE, wherein the first function instance corresponds to the first slice identifier;
transmitting, by the first UE, a data packet of the first service using the bearer, wherein the data packet corresponds to the first slice identifier;
sending, by the first UE, an uplink scheduling request to a first base station, wherein the uplink scheduling request comprises one or more of the first slice identifier and a first connection identity corresponding to the data packet that the first UE needs to send; and
receiving, by the first UE, resource assignment information from the first base station, wherein the resource assignment information comprises one or more of the first slice identifier and the first connection identity, wherein the at least one of a processing resource or a transmission resource corresponds to one or more of the first slice identifier and the first connection identity, and wherein the at least one of the processing resource or the transmission resource comprises an air interface transmission resource.

9. The method according to claim 8, wherein the transmitting, by the first UE, the data packet of the service by using the bearer comprises:
sending, by the first UE, an uplink data packet to the first function instance using the bearer, so that the first function instance processes the uplink data packet using at least one of the processing resource or the transmission resource corresponding to the first slice identifier.

10. The method according to claim 8, further comprising:
sending, by the first UE, an authentication request message to a controller, wherein the authentication request message comprises a first service identity corresponding to the first service of the first UE.

11. The method according to claim 8, further comprising:
sending, by the first UE, a service request message to a policy and charging enforcement function (PCEF) entity, wherein the service request message comprises a first service identity corresponding to the first service of the first UE.

12. A controller, comprising:
a processor configured to obtain a first slice identifier corresponding to a service, and determine, according to the first slice identifier, a first function instance corresponding to the first slice identifier;
a transmitter configured to separately send, to a first user equipment (UE) and to the first function instance, instruction information for setting up a bearer, wherein the bearer is used to transmit a data packet of the service corresponding to the first UE, the bearer corresponds to the first slice identifier, and the instruction information carries an identity of the first UE and an identity of the first function instance; and
a receiver configured to receive service information from a service provisioning server, wherein the service information comprises a service identity corresponding to the service and a quality of service requirement of the service;
wherein the processor is further configured to deploy the first function instance according to the service information, set up a correspondence between the first function instance deployed for the service and a network slice, and set up the correspondence between the service and the network slice according to the first function instance deployed for the service.

13. The controller according to claim 12, wherein the processor is further configured to obtain a correspondence between the service and the network slice, wherein the network slice corresponds to the first slice identifier.

14. The controller according to claim 12, wherein the service information further comprises area coverage of the service.

15. A user equipment, comprising:
a receiver configured to receive instruction information for setting up a bearer corresponding to a first slice identifier, wherein the instruction information carries an identity of the user equipment and an identity of the first function instance;
a processor configured to set up, according to the instruction information, the bearer between the user equipment and the first function instance, for serving a first service of the user equipment, wherein the first function instance corresponds to the first slice identifier; and
a transmitter configured to transmit a data packet of the first service by using the bearer, wherein the data packet corresponds to the first slice identifier;
wherein the transmitter is further configured to send an uplink data packet to the first function instance by using the bearer, so that the first function instance processes the uplink data packet by using at least one of a processing resource or a transmission resource corresponding to the first slice identifier; and
wherein the receiver is further configured to receive, by using the bearer, a downlink data packet from the first function instance after the first function instance processes the downlink data packet by using the at least one of the processing resource or the transmission resource corresponding to the first slice identifier.

16. The user equipment according to claim 15, wherein the transmitter is further configured to:
send an authentication request message to a controller, wherein the authentication request message comprises a first service identity corresponding to the first service of the user equipment.

17. The user equipment according to claim 15, wherein the transmitter is further configured to:
send a service request message to a policy and charging enforcement function (PCEF) entity, wherein the service request message comprises a first service identity corresponding to the first service of the user equipment.

* * * * *

UNITED STATES PATENT AND TRADEMARK OFFICE
CERTIFICATE OF CORRECTION

PATENT NO. : 10,595,233 B2
APPLICATION NO. : 15/923899
DATED : March 17, 2020
INVENTOR(S) : Zhang et al.

Page 1 of 1

It is certified that error appears in the above-identified patent and that said Letters Patent is hereby corrected as shown below:

In the Claims

Claim 9, Column 57, Line 31:
"the data packet of the service"
Should read:
-- "the data packet of the first service --.

Signed and Sealed this
Twenty-ninth Day of September, 2020

Andrei Iancu
*Director of the United States Patent and Trademark Office*